United States Patent
Yuan et al.

(10) Patent No.: US 12,346,683 B2
(45) Date of Patent: Jul. 1, 2025

(54) APPLYING A SOFTWARE PATCH VIA A CONTAINER IMAGE STORAGE ENGINE

(71) Applicant: International Business Machines Corporation, Armonk, NY (US)

(72) Inventors: Yi Yuan, Beijing (CN); Xiaopeng Zhang, Beijing (CN); Heng Wang, Beijing (CN); Xiao Hu He, Beijing (CN); Jing Li, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 212 days.

(21) Appl. No.: 18/216,349

(22) Filed: Jun. 29, 2023

(65) Prior Publication Data
US 2025/0004742 A1    Jan. 2, 2025

(51) Int. Cl.
*G06F 8/41* (2018.01)
*G06F 8/36* (2018.01)
*G06F 8/61* (2018.01)
*G06F 8/65* (2018.01)
*G06F 9/445* (2018.01)
(Continued)

(52) U.S. Cl.
CPC ...................... *G06F 8/65* (2013.01)

(58) Field of Classification Search
CPC . G06F 8/65; G06F 8/71; G06F 21/577; G06F 11/1433; G06F 11/1469; G06F 8/658; G06F 8/61; G06F 11/1464; G06F 8/60; G06F 3/0605; G06F 9/44505; G06F 3/0689; G06F 8/656; G06F 8/654; G06F 3/0632
See application file for complete search history.

(56) References Cited

U.S. PATENT DOCUMENTS

| | | | | |
|---|---|---|---|---|
| 10,740,132 | B2 * | 8/2020 | Goel | G06F 9/545 |
| 11,656,864 | B2 * | 5/2023 | Chen | G06F 8/63 |
| | | | | 717/168 |
| 12,086,575 | B2 * | 9/2024 | Ionescu | G06F 8/433 |

(Continued)

FOREIGN PATENT DOCUMENTS

| | | |
|---|---|---|
| CN | 106528224 A | 3/2017 |
| CN | 113111353 A | 7/2021 |

OTHER PUBLICATIONS

No Author. "OCI Image Configuration", opencontainers/image-spec, retrieved from web https://github.com/opencontainers/image-spec/blob/main/config.md#layer-diffid, dated Apr. 18, 2025, 4 pages.

*Primary Examiner* — Thuy Dao
(74) *Attorney, Agent, or Firm* — Edward J. Wixted, III

(57) ABSTRACT

Techniques are described with regard to container image configuration in a computing environment. An associated computer-implemented method includes initializing a container image storage engine associated with a logical tree structure having a plurality of container image nodes, where each of the plurality of container image nodes includes a hash layer array and a hash data array. The method includes building at least one new container image node to incorporate into the plurality of container image nodes. The method further includes applying a software patch to a target container image node among the plurality of container image nodes. In an embodiment, the method further includes starting at least one container based upon a respective container image node among the plurality of container image nodes.

20 Claims, 18 Drawing Sheets

(51) Int. Cl.
*G06F 9/46* (2006.01)
*G06F 11/34* (2006.01)

(56) References Cited

U.S. PATENT DOCUMENTS

| | | | |
|---|---|---|---|
| 12,197,940 B2 * | 1/2025 | Nizar | G06F 11/3433 |
| 2018/0129479 A1 | 5/2018 | McPherson et al. | |
| 2020/0097662 A1 | 3/2020 | Hufsmith et al. | |
| 2021/0173935 A1 | 6/2021 | Ramasamy et al. | |

* cited by examiner

I Spring Node 520

Unique Name Identifier: I Spring
705

Hash Layer Array: HL [SHA256(copy spring.jar), SHA256(ls)]
710

Hash Data Array: HD [SHA256(spring.jar), SHA256(0)]
715

Hash Tag: SHA256(HL[ ], HD[ ])
720

Base Image: I Java
725

FIG. 7

APPLYING A SOFTWARE PATCH VIA A CONTAINER IMAGE STORAGE ENGINE

BACKGROUND

The various embodiments described herein generally relate to container image configuration. More specifically, the various embodiments relate to software patch application via a container image storage engine.

SUMMARY

The various embodiments described herein provide techniques associated with software patch application in the context of container image storage and processing. An associated computer-implemented method includes initializing a container image storage engine associated with a logical tree structure having a plurality of container image nodes, where each of the plurality of container image nodes includes a hash layer array and a hash data array. Additionally, the method includes building at least one new container image node to incorporate into the plurality of container image nodes. Furthermore, the method includes applying a software patch to a target container image node among the plurality of container image nodes. In an embodiment, the method further includes starting at least one container based upon a respective container image node among the plurality of container image nodes.

One or more additional embodiments pertain to a computer program product including a computer readable storage medium having program instructions embodied therewith. According to such embodiment(s), the program instructions are executable by a computing device to cause the computing device to perform one or more steps of and/or to implement one or more embodiments associated with the above recited computer-implemented method. One or more further embodiments pertain to a system having at least one processor and a memory storing an application program, which, when executed on the at least one processor, performs one or more steps of and/or implements one or more embodiments associated with the above recited computer-implemented method.

BRIEF DESCRIPTION OF THE DRAWINGS

So that the manner in which the above recited aspects are attained and can be understood in detail, a more particular description of embodiments, briefly summarized above, may be had by reference to the appended drawings. Note, however, that the appended drawings illustrate only typical embodiments of the invention and therefore are not to be considered limiting of its scope, for the invention may admit to other equally effective embodiments.

FIG. 7 illustrates a data structure of an example application framework container image node, according to one or more embodiments.

DETAILED DESCRIPTION

Figure 1:
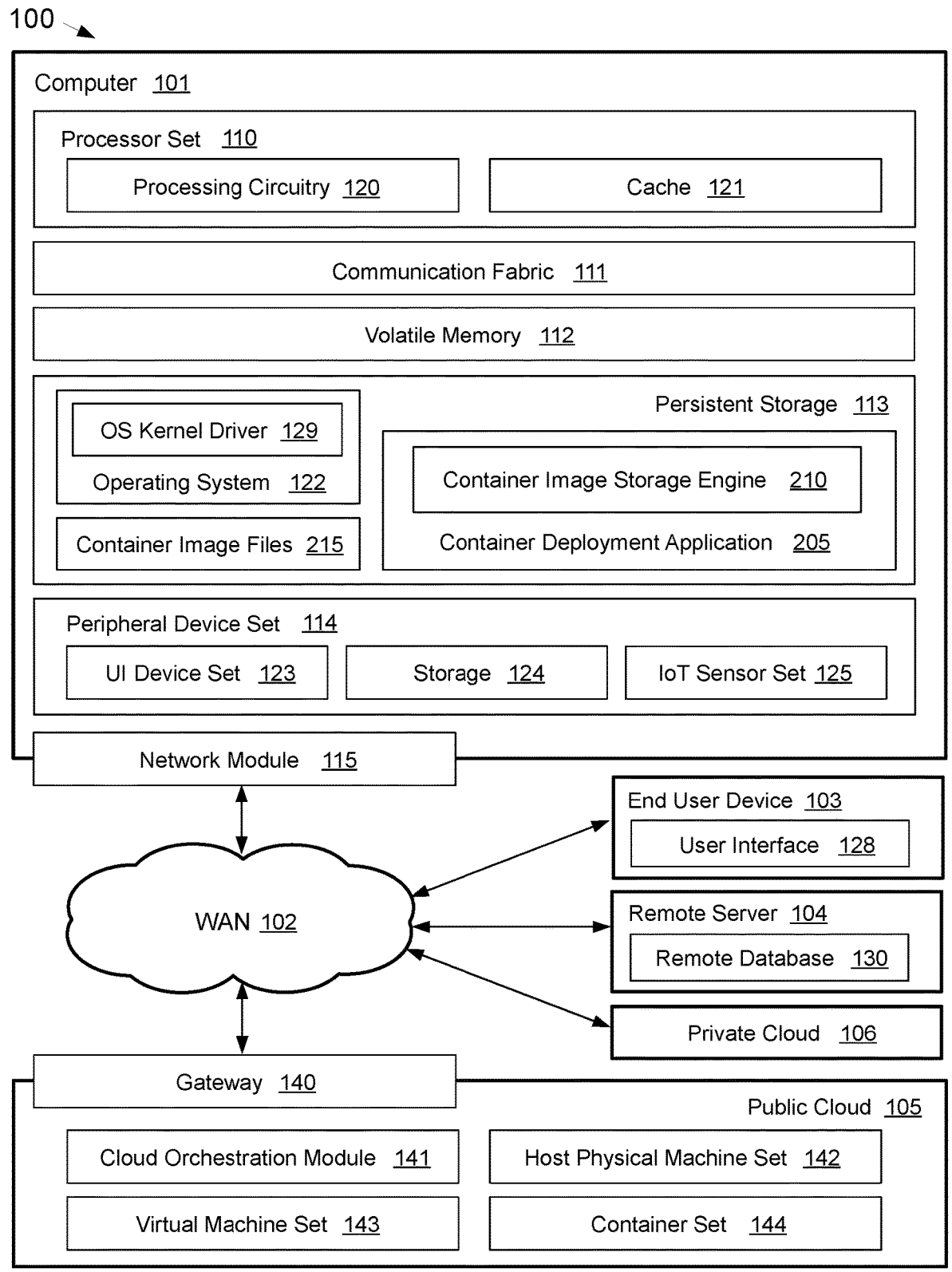
FIG. 1 illustrates a computing infrastructure, according to one or more embodiments.

The various embodiments described herein are directed to applying a software patch by rebuilding a target container image node incorporated into a logical tree structure associated with a container image storage engine. The various embodiments described herein have advantages over conventional techniques. The various embodiments improve computer technology by enabling container image updates without rebuilding a full container image stack. According to such embodiments, an update to a base container image node of the logical tree structure may be applied to any container associated with a child container image node without rebuilding the child container image node. Furthermore, the various embodiments improve computer technology by enabling linking of container image files in the context of starting containers, thus saving storage space at a host instance by rendering unnecessary redundant storage of container image files corresponding to each hierarchical level of the logical tree structure. Some of the various embodiments may not include all such advantages, and such advantages are not necessarily required of all embodiments.

In the following, reference is made to various embodiments of the invention. However, it should be understood that the invention is not limited to specific described embodiments. Instead, any combination of the following features and elements, whether related to different embodiments or not, is contemplated to implement and practice the invention. Furthermore, although embodiments may achieve advantages over other possible solutions and/or over the prior art, whether or not a particular advantage is achieved by a given embodiment is not limiting. Thus, the following aspects, features, embodiments, and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in one or more claims.

Various aspects of the present disclosure are described by narrative text, flowcharts, block diagrams of computer systems, and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one or more storage media (also called "mediums") collectively included in a set of one or more storage devices that collectively include machine readable code corresponding to instructions and/or data for performing computer operations specified in a given computer program product claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc), or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data typically is moved at some occasional points in time during normal operations of a storage device, such as during access, de-fragmentation, or garbage collection, but this does not render the storage device as transitory because the data is not transitory while it is stored.

Particular embodiments describe techniques relating to container image configuration. However, it is to be understood that the techniques described herein may be adapted to a variety of purposes in addition to those specifically described herein. Accordingly, references to specific embodiments are included to be illustrative and not limiting.

With regard to FIG. 1, computing environment 100 includes an example of an environment for execution of at least some of the computer code involved in performing the inventive methods, such as code included in or otherwise associated with container deployment application 205. In addition to container deployment application 205, computing environment 100 includes, for example, computer 101, wide area network (WAN) 102, end user device (EUD) 103, remote server 104, public cloud 105, and private cloud 106. As illustrated in FIG. 1, computer 101 includes processor set 110, communication fabric 111, volatile memory 112, persistent storage 113, peripheral device set 114, and network module 115. Processor set 110 includes processing circuitry 120 and cache 121. Persistent storage 113 includes operating system 122 and container deployment application 205, as identified above. Peripheral device set 114 includes user interface (UI) device set 123, storage 124, and Internet of Things (IoT) sensor set 125. EUD 103 includes user interface 128. User interface 128 is representative of a single user interface or multiple user interfaces. Remote server 104 includes remote database 130. Remote database 130 is representative of a single remote database or multiple remote databases. Public cloud 105 includes gateway 140, cloud orchestration module 141, host physical machine set 142, virtual machine set 143, and container set 144. Container set 144 optionally includes one or more containers processed via container deployment application 205.

Computer 101 may take the form of a desktop computer, laptop computer, tablet computer, smart phone, smart watch or other wearable computer, mainframe computer, quantum computer, or any other form of computer or mobile device now known or to be developed in the future that is capable of running a program, accessing a network, or querying a database, such as remote database 130. Computer 101 is included to be representative of a single computer or multiple computers. As is well understood in the art of computer technology, and depending upon the technology, performance of a computer-implemented method may be distributed among multiple computers and/or between multiple locations. As depicted in FIG. 1, detailed discussion is focused on a single computer, specifically computer 101, to keep the presentation of computing environment 100 as simple as possible. Additionally or alternatively to being connectively coupled to public cloud 105 and private cloud 106, computer 101 may be located in a cloud, even though it is not shown in a cloud in FIG. 1. On the other hand, computer 101 is not required to be in a cloud or connectively coupled to a cloud except to any extent as may be affirmatively indicated.

Processor set 110 includes one or more computer processors of any type now known or to be developed in the future. Processing circuitry 120 may be distributed over multiple packages, e.g., multiple coordinated integrated circuit chips. Processing circuitry 120 may implement multiple processor threads and/or multiple processor cores. Cache 121 is memory that is located in the processor chip package(s) and typically is used for data or code that should be available for rapid access by the threads or cores running on processor set 110. Cache memories typically are organized into multiple levels depending upon relative proximity to the processing circuitry. Alternatively, some or all of the cache 121 for processor set 110 may be located "off chip". In some computing environments, processor set 110 may be designed for working with qubits and performing quantum computing.

Computer readable program instructions typically are loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions and associated data are accessed by processor set 110 to control and direct performance of the inventive methods. In computing environment 100, at least some of the instructions for performing the inventive methods may be stored in container deployment application 205 in persistent storage 113.

Communication fabric 111 is the signal conduction path that allows the various components of computer 101 to communicate with each other. Typically, communication fabric 111 is made of switches and electrically conductive paths, such as the switches and electrically conductive paths that make up buses, bridges, physical input/output ports, and the like. Other types of signal communication paths may be used, such as fiber optic communication paths and/or wireless communication paths.

Volatile memory 112 is any type of volatile memory now known or to be developed in the future. Examples include dynamic type random access memory (RAM) or static type RAM. Typically, volatile memory 112 is characterized by random access, but this is not required unless affirmatively indicated. In computer 101, volatile memory 112 is located in a single package and is internal to computer 101, but additionally or alternatively volatile memory 112 may be distributed over multiple packages and/or located externally with respect to computer 101.

Persistent storage 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data, and rewriting of data. Persistent storage 113 may include magnetic disks and/or solid state storage devices. Operating system 122 may take several forms, such as various known proprietary operating systems or open source Portable Operating System Interface-type operating systems that employ a kernel. Operating system 122 includes an operating system kernel driver 129, which in the context of the various embodiments is associated with a file system implementation configured to facilitate container creation. In an embodiment, operating system kernel driver 129 is associated with a union mount file system implementation, e.g., OverlayFS, which layers multiple directories on computer 101 and presents the multiple directories as a single directory. In an additional embodiment, container deployment application 205 of persistent storage 113 is a virtualization application, e.g., a Docker application or an application otherwise compatible with the Docker command-line interface, that provides platform as a service (PaaS) functionality to deliver container-based services. Container deployment application 205 incorporates a container image storage engine 210. Container image storage engine 210 is an implementation of a container image storage driver that provides a programming interface configured to support and control aspects of operating system kernel driver 129. Container deployment application 205 utilizes operating system kernel driver 129 in conjunction with container image storage engine 210 in order to create containers based upon container image file content. Persistent storage 113 further includes container image files 215 processed via container image storage engine 210.

Peripheral device set 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion-type connections (e.g., secure digital (SD) card), connections made through local area communication networks, and even connections made through wide area networks such as the Internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (e.g., where computer 101 locally stores and manages a large database), such storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor among IoT sensor set 125 may be a thermometer, and another sensor may be a motion detector.

Network module 115 is the collection of computer software, hardware, and firmware that allows computer 101 to communicate with other computers through WAN 102. Network module 115 may include hardware such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments, e.g., embodiments that utilize software-defined networking (SDN), the control functions and the forwarding functions of network module 115 are performed on physically separate devices, such that the control functions manage several different network hardware devices. Computer readable program instructions for performing the inventive methods typically can be downloaded to computer 101 from an external computer or external storage device through a network adapter card or network interface included in network module 115.

Wide area network (WAN) 102 is any wide area network, e.g., the Internet, capable of communicating computer data over non-local distances by any technology for communicating computer data, now known or to be developed in the future. In some embodiments, WAN 102 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers, and edge servers.

End user device (EUD) 103 is any computer system that is used and controlled by an end user, e.g., a customer of an enterprise or other organization that operates computer 101. EUD 103 may take any of the forms previously discussed in connection with computer 101. EUD 103 typically receives helpful and useful data from the operations of computer 101. For example, in a hypothetical case where computer 101 is designed to provide a response to an end user, such response typically would be communicated from network module 115 of computer 101 through WAN 102 to EUD 103. In this way, EUD 103 can display, or otherwise present, the response to an end user, e.g., via user interface 128. In another example, in a hypothetical case where computer 101 is designed to provide configuration information to user interface 128, e.g., via container deployment application 205, such configuration information typically would be communicated from network module 115 of computer 101 through WAN 102 to EUD 103. In some embodiments, EUD 103 may be a client device, such as thin client, heavy client, mainframe computer, desktop computer, and so on.

Remote server 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data (e.g., user history data), such historical data may be provided to computer 101 from remote database 130 of remote server 104.

Public cloud 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. Public cloud 105 optionally offers PaaS, infrastructure as a service (IaaS), software as a service (SaaS), and/or other cloud computing services. The computing resources provided by public cloud 105 typically are implemented by virtual computing environments (VCEs) that run on various computers making up the computers of host physical machine set 142, which is the universe of physical computers in and/or available to public cloud 105. The VCEs typically take the form of virtual machines from virtual machine set 143 and/or containers from container set 144. It is understood that such VCEs may be stored as images and may be transferred among and between the various physical machine hosts, either as images or after instantiation of the VCE. Cloud orchestration module 141 manages the transfer and storage of images, deploys new instantiations of VCEs, and manages active instantiations of VCE deployments. Gateway 140 is the collection of computer software, hardware, and firmware that allows public cloud 105 to communicate through WAN 102.

VCEs can be stored as "images". A new active instance of the VCE can be instantiated from the image. Two familiar types of VCEs are virtual machines and containers. A container is a VCE that uses operating-system-level virtualization. Containerization refers to an operating system feature in which the operating system kernel allows the existence of multiple isolated user space instances, called containers. These isolated user space instances typically behave as real computers from the perspective of programs running in them. Containerization facilitates execution of one or more isolated computing processes. A container occupies an isolated user space that supports virtualization at the operating system level and/or at the application level. A computer program running on an ordinary operating system can utilize all resources of that computer, such as connected devices, files and folders, network shares, central processing unit (CPU) power, and quantifiable hardware capabilities. However, programs running inside a container only can use the contents of the container and devices assigned to the container. In the context of the various embodiments, a container is a runtime instance of a container image on allocated disk space. In the context of the various embodiments, a container image is a static file that includes executable code to create a container. A container image is a software unit packaging code and code dependencies executable in diverse computing environments. A container image includes system libraries, system tools, and other platforms settings that required for application execution on a containerization platform.

Private cloud 106 is similar to public cloud 105, except that the computing resources only are available for use privately, e.g., within a single organization. While private cloud 106 is depicted in FIG. 1 as being in communication with WAN 102, in other embodiments a private cloud optionally is disconnected from the Internet or other public network entirely and is accessible only through a local/private network. A hybrid cloud is a composition of multiple clouds of different types (e.g., private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 both are part of a larger hybrid cloud.

In the context of the various embodiments described herein, components of computing environment 100, including aspects of container deployment application 205, provide, or are configured to provide, any entity associated with container image configuration, e.g., any entity associated with computer 101, EUD 103, or another aspect of computing environment 100, advance notice of any personal data collection. Components of computing environment 100 further provide, or further are configured to provide, any affected entity an option to opt in or opt out of any such personal data collection at any time. Optionally, components of computing environment 100 further transmit, or further are configured to transmit, notification(s) to any affected entity each time any such personal data collection occurs and/or at designated time intervals.

Figure 2:
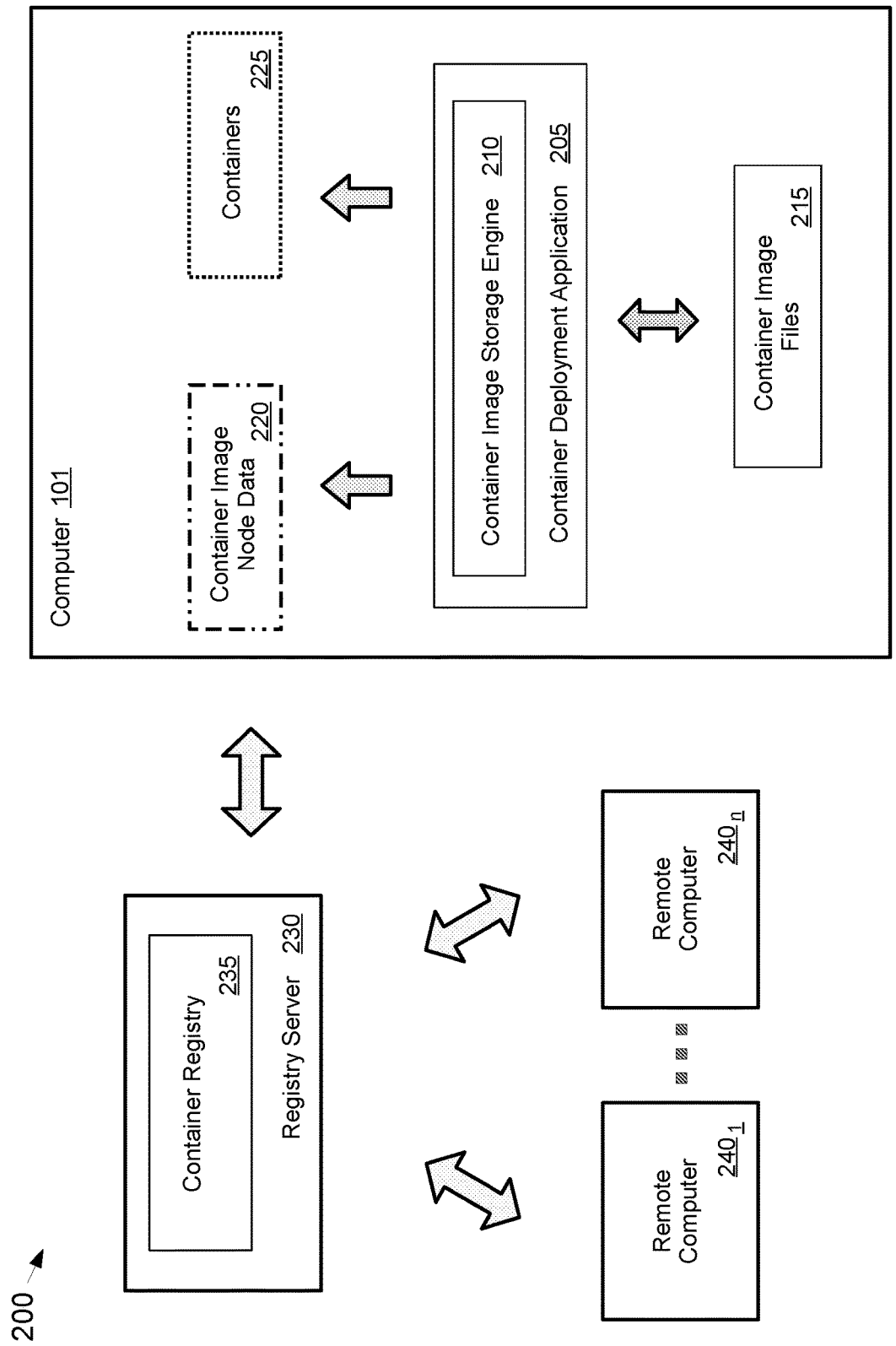
FIG. 2 illustrates a container image management infrastructure, according to one or more embodiments.

FIG. 2 illustrates a container image management infrastructure 200 configured to handle software patch application and other container image processing tasks associated with container deployment application 205 and container image storage engine 210 included in computer 101. In the context of the various embodiments, container image storage engine 210 incorporates a logical tree node structure in compliance with the specifications of the Open Container Initiative (OCI) open governance structure. As further described herein, consequent to application of a software patch, container deployment application 205 updates container image file aspect(s) among container image files 215 stored on a disk (representative of a single disk or multiple disks) in persistent storage 113 of computer 101.

In the context of container image management infrastructure 200, computer 101 further includes container image node data 220 associated with respective container image nodes of a logical tree structure associated with container image storage engine 210. The logical tree structure associated with container image storage engine 210 is loaded in RAM, i.e., is loaded on a RAM device in volatile memory 112 of computer 101. As further described herein, each respective container image node includes hashed layer(s) and hashed data associated with a respective container image. As further described herein, a container image node among container image node data 220 includes datapoints associated with a respective container image and is configurable via container deployment application 205. In the context of container image management infrastructure 200, computer 101 further includes containers 225. A respective container among containers 225 is a runtime instance of a respective container image. A respective container among containers 225 includes a collection of container image files linked according to the logical tree structure associated with container image storage engine 210. Container deployment application 205 optionally allocates disk space in ROM in persistent storage 113 to each respective container among containers 225. Additionally or alternatively, container deployment application 205 builds or configures one or more containers among container set 144 in public cloud 105.

Container image management infrastructure 200 further includes a registry server 230. Registry server 230 includes a container registry 235. In the context of the various embodiments, a container registry is a repository or a collection of repositories used for container image storage and access. Container image management infrastructure 200 further includes remote computers $240_1$ to $240_n$. Each computer among computer 101 and remote computers $240_1$ to $240_n$ is a host instance configured for container image processing. Computer 101 is a host instance configured for container image processing via container deployment application 205 and container image storage engine 210. Computer 101 is communicatively coupled to registry server 230, e.g., via WAN 102. Furthermore, each of remote computers $240_1$ to $240_n$ is communicatively coupled to registry server 230, e.g., via WAN 102.

Figure 3:
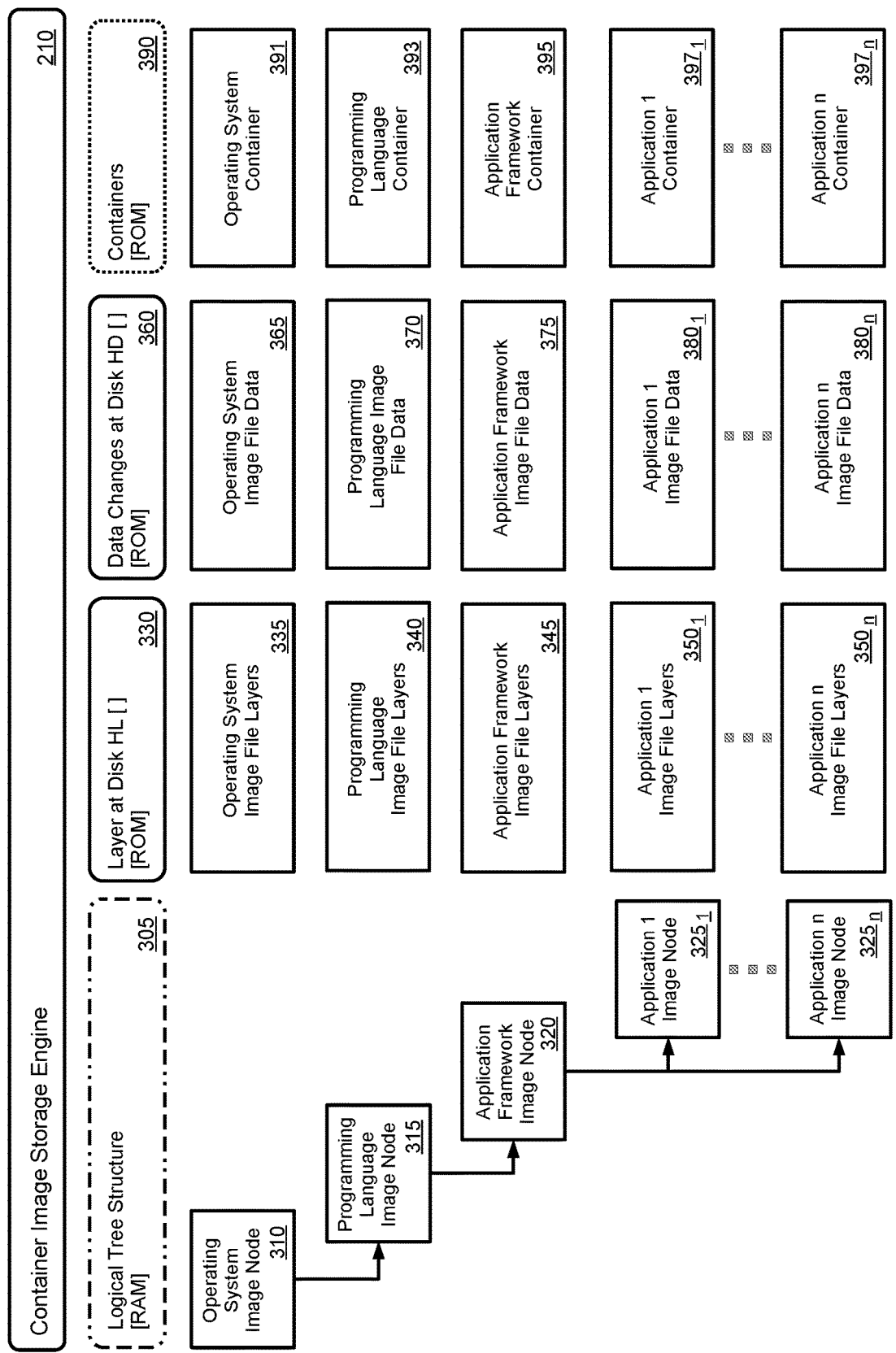
FIG. 3 illustrates a schematic diagram of a container image storage engine, according to one or more embodiments.

FIG. 3 illustrates a schematic diagram of container image storage engine 210 in accordance with one or more embodiments. Container image storage engine 210 is presented for example purposes and is not intended to be limiting. Container image storage engine 210 includes logical tree structure 305. Aspects of logical tree structure 305 are loaded in RAM, e.g., from container image node data 220. Logical tree structure 305 includes a plurality of container image nodes organized on hierarchical levels, including operating system container image node 310, programming language container image node 315, application framework container image node 320, and application container image nodes $325_1$ to $325_n$, including application 1 container image node $325_1$ to application n container image node $325_n$. Operating system container image node 310 is associated with an operating system image, e.g., a JavaOS image. Programming language container image node 315 is associated with a programming language image, e.g., a Java image. Programming language container image node 315 is representative of a single programming language container image node or multiple programming language container image nodes (i.e., there may be multiple child programming language container image nodes 315 with respect to operating system container image node 310). Application framework container image node 320 is associated with an application framework image, e.g., a Spring image. Application framework container image node 320 is representative of a single application framework container image node or multiple application framework container image nodes (i.e., there may be multiple child application framework container image nodes 320 with respect to programming language container image node 315). According to the hierarchical relationship of logical tree structure 305, application framework container image node 320 is a base container image node (i.e., a parent container image node) of application container image nodes $325_1$ to $325_n$, programming language container image node 315 is a base container image node of application framework container image node 320, and operating system container image node 310 is a base container image node of programming language container image node 315 and is also a root container image node of logical tree structure 305. In one or more alternative embodiments, logical tree structure 305 includes one or more additional or alternative nodes. For instance, logical tree structure 305 in an alternative embodiment may include a message queue container image node (MQ node) on the same hierarchical level as application framework container image node 320, in which case programming language container image node 315 would be a base container image node of such message queue container image node.

Container image storage engine 210 further references container image file layers 330 associated with container image nodes of logical tree structure 305. Container image file layers 330 include layers among container image files 215 stored in ROM on the aforementioned disk in persistent storage 113. Container image file layers 330 include operating system image file layers 335 associated with operating system container image node 310, programming language image file layers 340 associated with operating system container image node 315, application framework image file layers 345 associated with application framework container image node 320, and application image file layers $350_1$ to $350_n$ respectively associated with application container image nodes $325_1$ to $325_n$. Container image storage engine 210 further references container image file data 360 associated with container image nodes of logical tree structure 305. Container image file data 360 includes data among container image files 215 stored in ROM on the aforementioned disk in persistent storage 113. Container image file data 360 includes operating system image file data 365 associated with operating system container image node 310, programming language image file data 370 associated with operating system container image node 315, application framework image file data 375 associated with application framework container image node 320, and application image file data 380$_1$ to 380, respectively associated with application container image nodes $325_1$ to $325_n$. Container image file data 360 associated with a respective container image node of logical tree structure 305 includes data changes in ROM consequent to executing a command within a file layer of the respective container image node.

Container image storage engine 210 further references containers 390 (stored in ROM among containers 225). Containers 390 include operating system container 391, programming language container 393, application framework container 395, and application containers $397_1$ to $397_n$. Container deployment application 205 starts a container among containers 390 from a respective container image node in logical tree structure 305 by tracing back to the root container image node of logical tree structure 305 and linking container image files (including container image file layers 330 and container image file data 360) of each hierarchical container image node layer from the respective container image node to the root container image node. To start application 1 container $397_1$, container deployment application 205 links container image files from application 1 image node $325_1$, container image files from application framework container image node 320, container image files from operating system container image node 315, and container image files from operating system container image node 310 (the root container image node). To start application framework container 395, container deployment application 205 links container image files from application framework container image node 320, container image files from operating system container image node 315, and container image files from operating system container image node 310. To start programming language container 393, container deployment application 205 links container image files from operating system container image node 315 and container image files from operating system container image node 310. While operating system container 391, programming language container 393, and application framework container 395 are depicted in FIG. 3 for completeness, in practice an end user generally would utilize application containers $397_1$ to $397_n$ for task execution.

Figure 4:
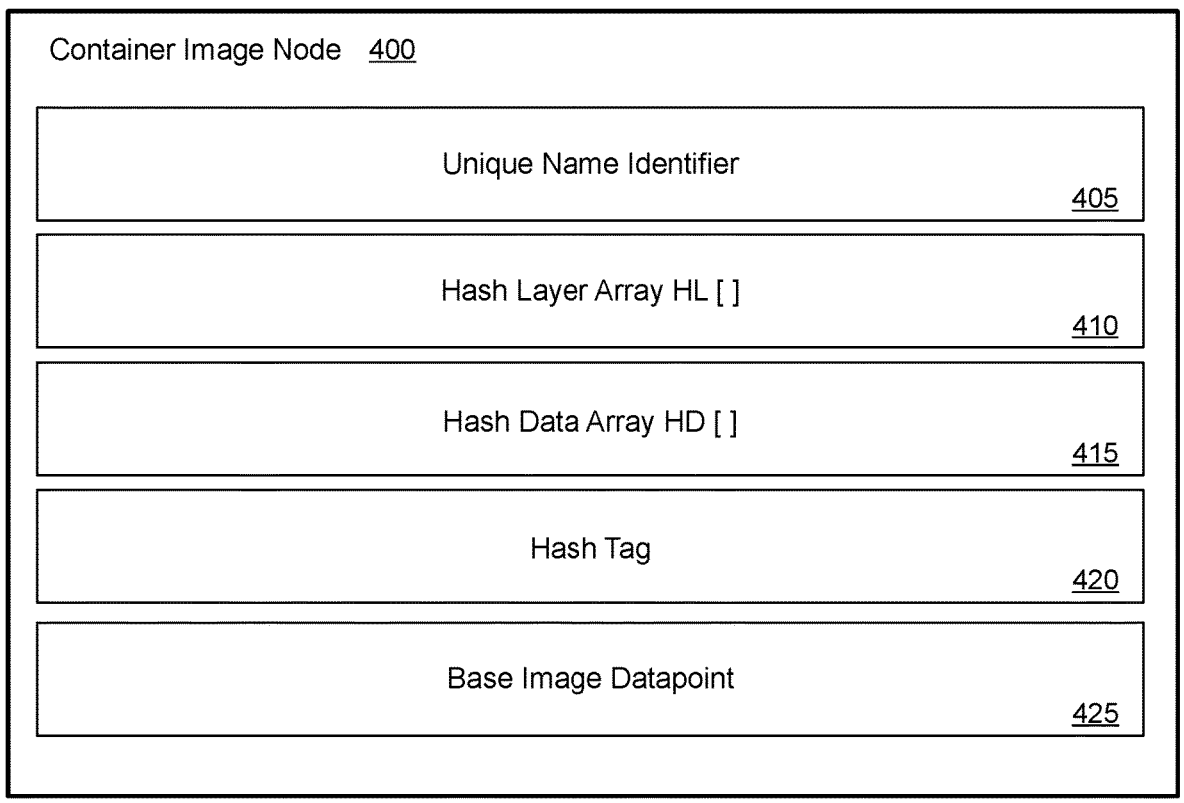
FIG. 4 illustrates a data structure of a container image node, according to one or more embodiments.

FIG. 4 illustrates a data structure of a container image node 400. Container image node 400 is representative of a container image node in logical tree structure 305. Container image node 400 includes a unique name identifier 405 that indicates a name associated with the container image. Container image node 400 further includes a hash layer array 410, which is an array of container image file layers 330 associated with the container image node 400. In the context of the various embodiments, respective array elements of hash layer array 410 are hashed representations of respective layers. The hashed representations of respective layers are hash values of respective commands that map to a container image file (e.g., a .jar file) including step-by-step guidance for container image construction. In the context of the various embodiments, a hash layer array of container image node 400, when linked with respective hash layer arrays of respective container image nodes from the base container image node to the root container image node, enables a single way hash chain reflective of logical tree structure 305 from the root container image node level (e.g., operating system level) to the level of container image node 400.

Container image node 400 further includes a hash data array 415, which is an array of container image file data 360 associated with the container image node 400. In the context of the various embodiments, hash data array 415 includes data associated with the array of commands included in hash layer array 410. A one-to-one mapping correspondence exists between a respective hash layer array element and a respective hash data array element. A hash data array element includes a hash value result of data changes in ROM consequent to executing a corresponding hash layer array command, i.e., the ROM disk space delta (data diff) between pre-command execution and post-command execution. In the event that no ROM disk space changes are made consequent to executing a command associated with a hash layer array command, the container deployment application calculates a corresponding hash data array element as a hash value of zero ROM disk space changes, i.e., SHA256(0)=0. Container image node 400 further includes a hash tag 420 as a hash value resulting from applying a hash function to hash layer array 410 and hash data array 415, such that hash_tag=hash(HL[ ], HD[ ]), e.g., hash_tag=SHA256(HL[ ], HD[ ]). Container image node 400 further includes a base image datapoint 425 indicating a base container image node (i.e., a parent container image node) associated with container image node 400.

Figure 5:
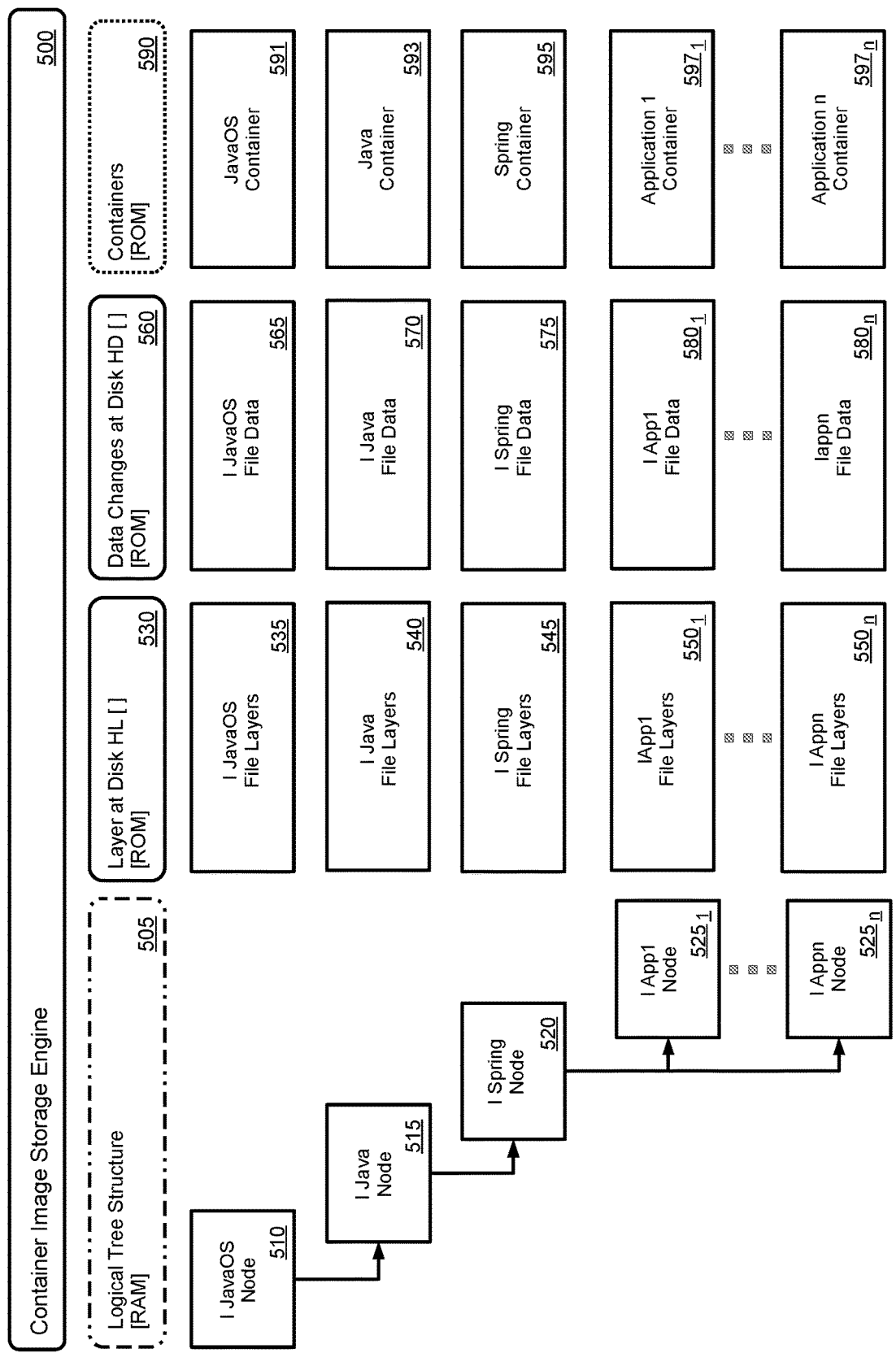
FIG. 5 illustrates a schematic diagram of an example container image storage engine implementation, according to one or more embodiments.

FIG. 5 illustrates a schematic diagram of container image storage engine implementation 500, which is an example implementation of container image storage engine 210 in accordance with one or more of the various embodiments described herein. Container image storage engine implementation 500 includes example names for the generic elements described in container image storage engine 210 as illustrated in FIG. 3. Container image storage engine implementation 500 includes logical tree structure 505 having a plurality of container image nodes organized on hierarchical levels, including I JavaOS node 510, I Java node 515, I Spring node 520, and I App1 to I Appn nodes $525_1$ to $525_n$. According to the hierarchical relationship of logical tree structure 505, I Spring node 520 is a base container image node of I App1 to I Appn nodes $525_1$ to $525_n$, I Java node 515 is a base container image node of I Spring node 520, and I JavaOS node 510 is a base container image node of I Java node 515 and is also the root container image node of logical tree structure 505.

Container image storage engine implementation 500 further includes container image file layers 530 associated with container image nodes of logical tree structure 505. Container image file layers 530 include I JavaOS file layers 535 associated with I JavaOS node 510, I Java layers 540 associated with I Java node 515, I Spring file layers 545 associated with I Spring node 520, and I App1 to I Appn file layers $550_1$ to $550_n$ respectively associated with I App1 to I Appn nodes $525_1$ to $525_n$. Container image storage engine implementation 500 further includes container image file data 560 associated with container image nodes of logical tree structure 505. Container image file data 560 includes I JavaOS file data 565 associated with I JavaOS node 510, I Java file data 570 associated with I Java node 515, I Spring file data 575 associated with I Spring node 520, and App1 to I Appn file data $580_1$ to $580_n$ respectively associated with I App1 to I Appn nodes $525_1$ to $525_n$. Container image file data 560 associated with a respective container image node of logical tree structure 505 includes data changes in ROM consequent to executing a command within a file layer of the respective container image node.

Container image storage engine implementation 500 further includes containers 590. Containers 590 include JavaOS container 591, Java container 593, Spring container 595, and App1 to Appn containers $597_1$ to $597_n$. To start App1 container $597_1$, container deployment application 205 links container image files from I App1 node $525_1$, container image files from I Spring node 520, container image files from I Java node 515, and container image files from I JavaOS node 510 (the root container image node). To start Spring container 595, container deployment application 205 links container image files from I Spring node 520, container image files from I Java node 515, and container image files from I JavaOS node 510. To start Java container 593, container deployment application 205 links container image files from I Java node 515 and container image files from I JavaOS node 510.

Figure 6:
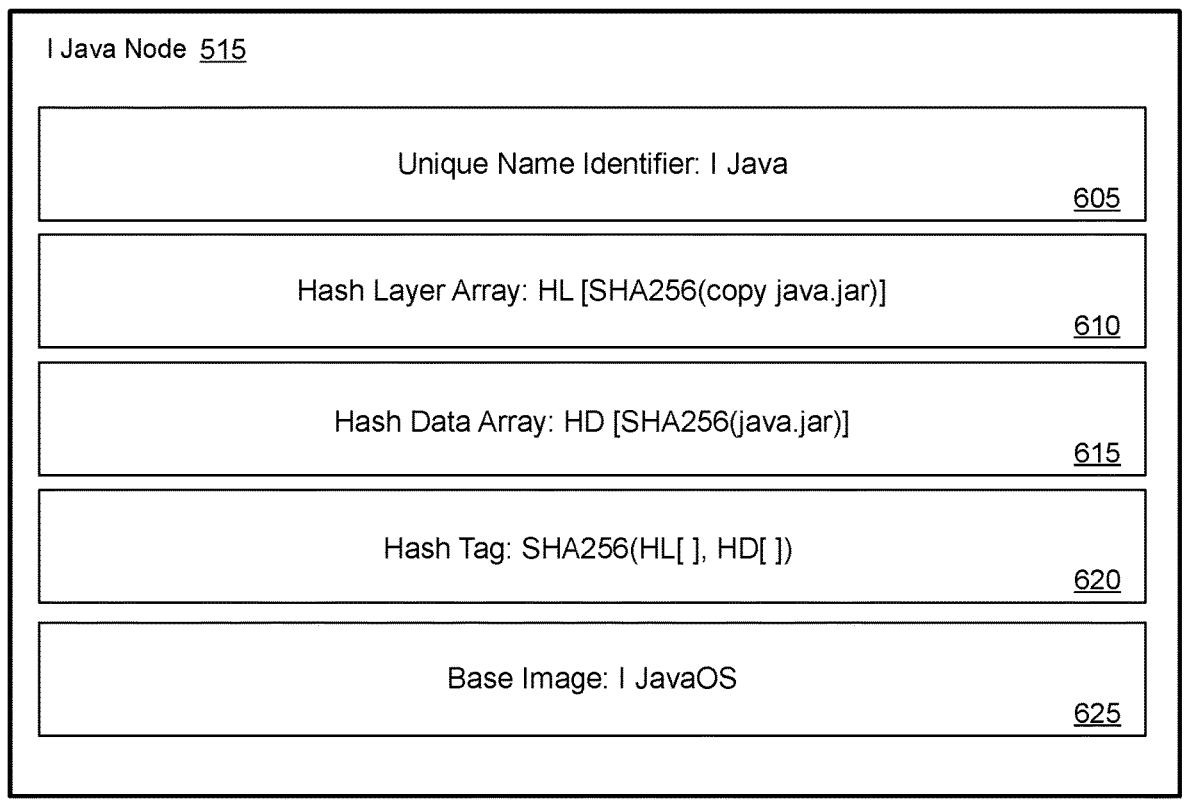
FIG. 6 illustrates a data structure of an example programming language container image node, according to one or more embodiments.

FIG. 6 illustrates a data structure of example programming language container image node I Java node 515. I Java node 515 includes unique name identifier 605, indicated as 'I Java'. I Java node 515 additionally includes hash layer array 610, indicated as 'HL [SHA256(copy java.jar)]'. Hash layer array 610 includes a hash value of the 'copy java.jar' command. I Java node 515 further includes hash data array 615, indicated as 'HD [SHA256(java.jar)]'. Hash data array 615 includes a hash value of the data changes in ROM consequent to executing the 'copy java.jar' command. I Java node 515 further includes a hash tag 620 as a hash value resulting from applying a hash function to hash layer array 610 and hash data array 615, indicated as 'SHA256(HL[ ], HD[ ])'. I Java node 515 further includes a base image datapoint 625, indicated as 'I JavaOS' since I JavaOS is the base container image of I Java.

FIG. 7 illustrates a data structure of example application framework container image node I Spring node 520. I Spring node 520 includes unique name identifier 705, indicated as 'I Spring'. I Spring node 520 additionally includes hash layer array 710, indicated as 'HL [SHA256(copy spring.jar), SHA256(ls)]'. Hash layer array 710 includes hash values of the 'copy spring.jar' command and the 'ls' (list) command. I Spring node 520 further includes hash data array 715, indicated as 'HD [SHA256(spring.jar), SHA256(0)]'. Hash data array 715 includes hash values of respective data changes in ROM consequent to executing the 'copy spring.jar' command and the 'ls' command. Since no data changes in ROM occur consequent to executing the 'ls' command, the hash data array element corresponding to the 'ls' command reflects a zero value. I Spring node 520 further includes a hash tag 720 as a hash value resulting from applying a hash function to hash layer array 710 and hash data array 715, indicated as 'SHA256(HL[ ], HD[ ])'. I Spring node 520 further includes a base image datapoint 725, indicated as 'I Java' since I Java is the base container image of I Spring.

Figure 8:
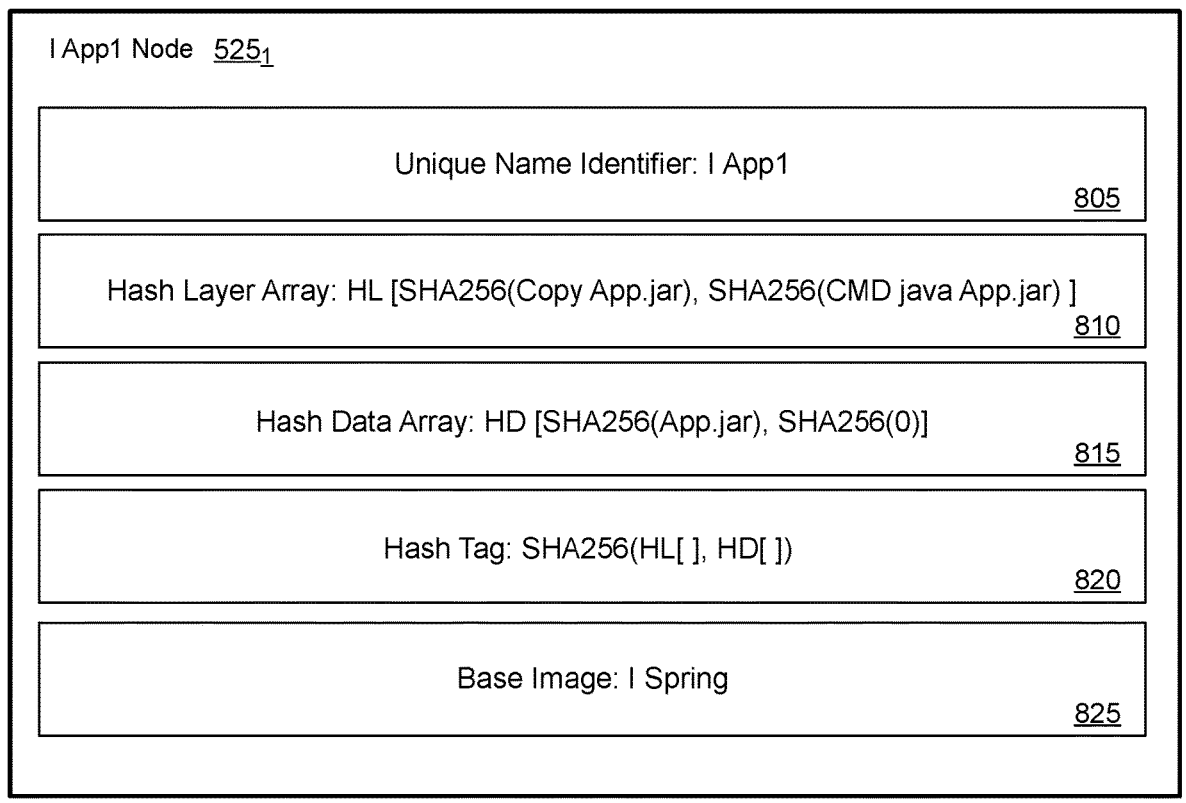
FIG. 8 illustrates a data structure of an example application container image node, according to one or more embodiments.

FIG. 8 illustrates a data structure of example application container image node I App1 node $525_1$. I App1 node $525_1$ includes unique name identifier 805, indicated as 'I App1'. I App1 node $525_1$ additionally includes hash layer array 810, indicated as 'HL [SHA256(Copy App.jar), SHA256(CMD java App.jar)]'. Hash layer array 810 includes hash values of the 'copy App.jar' command and the 'CMD java App.jar' command. App1 node $525_1$ further includes hash data array 815, indicated as 'HD [SHA256(App.jar), SHA256(0)]'. Hash data array 815 includes hash values of respective data changes in ROM consequent to executing the 'copy App.jar' command and the 'CMD java App.jar' command. Since no data changes in ROM occur consequent to executing the 'CMD java App.jar' command, the hash data array element corresponding to the 'CMD java App.jar' command reflects a zero value. App1 node $525_1$ further includes a hash tag 820 as a hash value resulting from applying a hash function to hash layer array 810 and hash data array 815, indicated as 'SHA256(HL[ ], HD[ ])'. App1 node $525_1$ further includes a base image datapoint 825, indicated as 'I Spring' since I Spring is the base container image of I App1.

Figure 9:
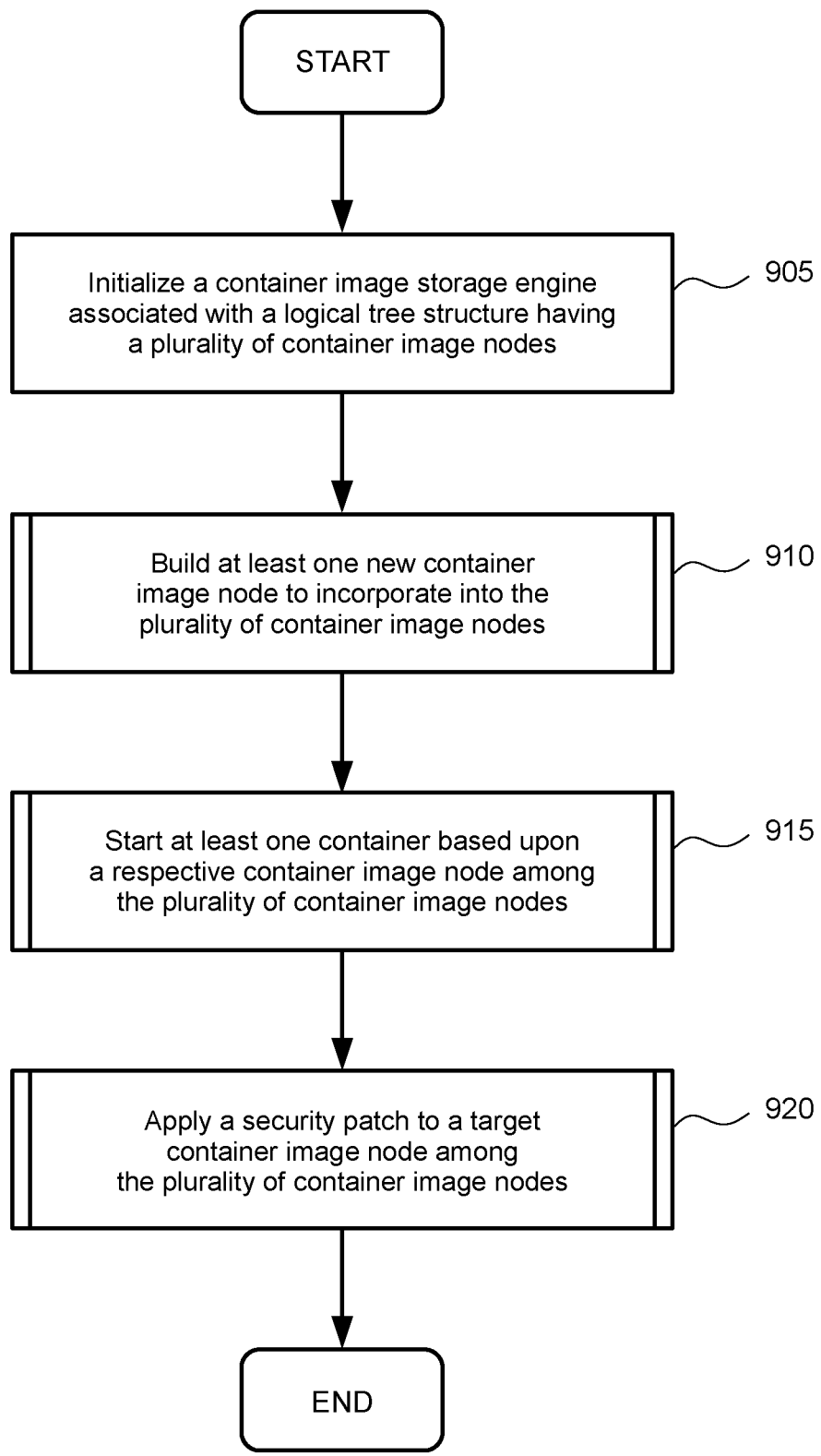
FIG. 9 illustrates a method of applying a software patch via a container image storage engine, according to one or more embodiments.

FIG. 9 illustrates a method 900 of applying a software patch via a container image storage engine (e.g., container image storage engine 210). The container image storage engine is associated with a logical tree structure (e.g., logical tree structure 305) having a plurality of container image nodes (e.g., container image node 400). Each of the plurality of container image nodes includes a hash layer array (e.g., hash layer array 410) and a hash data array (e.g., hash data array 415). One or more steps associated with the method 900 and related methods described herein are carried out via a container deployment application of a container deployment application host instance in a computing environment (e.g., via container deployment application 205 of computer 101 in computing environment 100). One or more steps associated with the method 900 and the other methods described herein optionally are carried out within, or in association with, one or more workloads of a cloud computing environment. Such cloud computing environment optionally includes a public cloud (e.g., public cloud 105) and/or a private cloud (e.g., private cloud 106).

The method 900 begins at step 905, where the container deployment application initializes the container image storage engine. In an embodiment, initializing the container image storage engine includes loading the logical tree structure, including container image nodes already built and incorporated into the logical tree structure, into RAM of the container deployment application host instance (e.g. RAM among volatile memory 112) from a disk in persistent storage (e.g., persistent storage 113) of the container deployment application host instance. The container deployment application loads container image node data (e.g., container image node data 220) based upon a set of container image files (e.g., container image files 215) stored on the disk in persistent storage of the container deployment application host instance. In an additional embodiment, the container image files stored on the disk are stored in ROM. As further described with respect to step 910, the container deployment application is configured to build further container image node(s) in the context of the method 900 in addition to any container image node already built upon engine initialization. In a further embodiment, in addition to the hash layer array and the hash data array, each of the plurality of container image nodes includes a unique name identifier (e.g., unique name identifier 405). In a further embodiment, each of the plurality of container image nodes includes a hash tag (e.g., hash tag 420). In a further embodiment, each of the plurality of container image nodes includes a base image datapoint (e.g., base image datapoint 425) referencing any base container image node. In a further embodiment, in accordance with the OCI open governance structure, the container deployment application generates the logical tree structure during runtime. In a related embodiment, the logical tree structure includes all dependency relationships from a respective container image node to a root container image node and, if applicable, any dependency relationship between the respective container image node and any child container image node. Additionally or alternatively, each of the plurality of container image nodes includes image dependency datapoints associated with the logical tree structure that describe respective dependency relationships among the container image nodes.

At step 910, the container deployment application builds at least one new container image node to incorporate into the plurality of container image nodes. According to step 910, the container deployment application builds and adds at least one new container image node to the plurality of container image nodes already built upon initialization. In an embodiment, the container deployment application applies a build command, e.g., Docker build command, to build one or more of the at least one new container image node. In an embodiment, the container deployment application builds one or more of the at least one new container image node by encapsulating at least one common aspect of multiple container image nodes among the plurality of container image nodes into a virtual container image node. According to this embodiment, the container deployment application combines at least one aspect common to multiple container image nodes, i.e., at least one aspect identical or closely analogous among multiple container image nodes, into a virtual container image node. Encapsulation according to this embodiment may facilitate data optimization in association with the logical tree structure. For instance, given multiple container image nodes having common aspect(s) among hash layer array elements and/or hash data array elements, e.g., a command common to each of the multiple container image nodes, the container deployment application may encapsulate the common aspect(s) into a virtual container image node. In a related embodiment, the virtual container image node is incorporated into the logical tree structure. In an additional related embodiment, the container deployment application replaces multiple preexisting container image nodes among the plurality of container image nodes (e.g., multiple container image nodes already built and loaded into the logical tree structure) with a virtual container image node by encapsulating at least one common aspect of the multiple preexisting container image nodes into the virtual container image node. A method of building the at least one new container image node in accordance with step 910 is described with respect to FIG. 10.

At step 915, the container deployment application starts at least one container based upon (i.e., starts at least one container from) a respective container image node among the plurality of container image nodes. Per step 915, the container deployment application starts a single container from the at least one respective container image node or alternatively starts multiple containers from the at least one respective container image node. In an embodiment, the at least one container started per step 915 is stored in ROM (e.g., among containers 225). In an additional embodiment, the container deployment application applies a start command, e.g., Docker start command, to start one or more containers among the at least one container. In a further embodiment, the container deployment application repeats step 915 to start at least one additional container based upon an additional respective container image node among the plurality of container image nodes. For instance, the container deployment application may start one or more application containers based upon an application container image node among the plurality of container image nodes and further may start one or more additional application containers based upon an additional application container image node among the plurality of container image nodes. According to such further embodiment, the container deployment application may repeat step 915 any time starting at least one container is required. A method of starting the at least one container based upon the respective container image node in accordance with step 915 is described with respect to FIG. 11.

At step 920, the container deployment application applies a software patch to a target container image node among the plurality of container image nodes. In an embodiment, the software patch is a security patch. In a related embodiment, the container deployment application applies the software patch per step 920 to address a security issue related to common vulnerabilities and exposures (CVE). In a further related embodiment, the container deployment application addresses a CVE-related issue by updating a logging utility file, e.g., by updating a log 4j configuration file. In an additional embodiment, the software patch addresses at least one software defect, i.e., software bug. Methods of applying the software patch to the target container image node in accordance with step 920 are described with respect to FIGS. 12 and 16.

In an alternative embodiment, the container deployment application executes steps of the method 900 in alternative order. For instance, the container deployment application may build at least one new container image node per step 910 subsequent to software patch application at step 920. In another instance, the container deployment application may start at least one container per step 915 subsequent to software patch application per step 920. In a further instance, the container deployment application may build at least one new container image node per step 910 prior to software patch application per step 920 and may build at least one additional new container per step 910 subsequent to software patch application per step 920. In a further instance, the container deployment application may start at least one container per step 915 prior to software patch application per step 920 and further may start at least one additional container per step 915 subsequent to software patch application per step 920. In a further alternative embodiment, the container deployment application executes only a subset of steps of the method 900.

Figure 10:
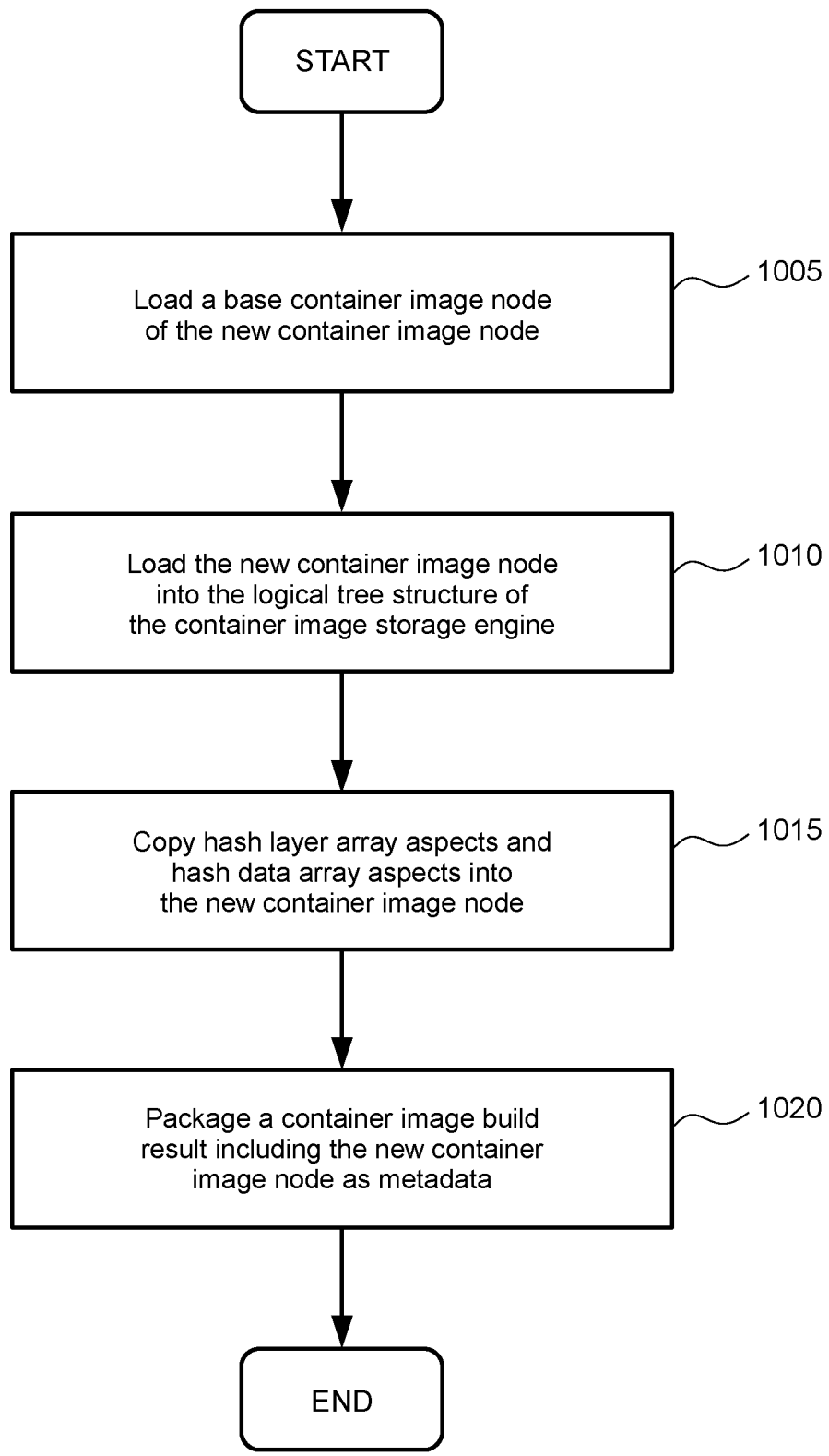
FIG. 10 illustrates a method of building at least one new container image node to incorporate into a plurality of container image nodes, according to one or more embodiments.

FIG. 10 illustrates a method 1000 of building the at least one new container image node to incorporate into the plurality of container image nodes. The method 1000 provides one or more embodiments with respect to step 910 of the method 900. The container deployment application executes the steps of the method 1000 for each new container image node among the at least one new container image node to be incorporated. The method 1000 begins at step 1005, where the container deployment application loads a base container image node of the new container image node. In the context of the various embodiments, a base container image node includes a container image based upon which the container deployment application builds the new container image node. In an embodiment, the base container image node is a parent container image node of the new container image node. In an additional embodiment, the container deployment application loads the base container image node from the container image node data at the container deployment application host instance through use of a keyword instruction associated with base image loading, e.g., through use of the Docker-based instruction "FROM" or an analogous instruction. The "FROM" instruction links container image file content specific to the new container image node to container image file content of the base container image node, in accordance with the hierarchy of the logical tree structure of the container image storage engine. The "FROM" instruction enables starting a container based upon the newly built container image node by linking container image file content from the new container image node to the base container image node, and ultimately to a root container image node, according to the logical tree structure.

At step 1010, the container deployment application loads the new container image node into the logical tree structure of the container image storage engine. At step 1015, the container deployment application copies hash layer array aspects and hash data array aspects into the new container image node. In an embodiment, the container deployment application calculates a hash value of a layer command included in container image file content of the new container image node and appends such layer command hash value to the hash layer array and further calculates a hash value of data changes consequent to executing the layer command and appends such data change hash value to the hash data array, thus increasing container image content. At step 1020, the container deployment application packages a container image build result including the new container image node as metadata. In an embodiment, the container image build result includes container image file content and metadata structural aspects associated with the new container image node.

Figure 11:
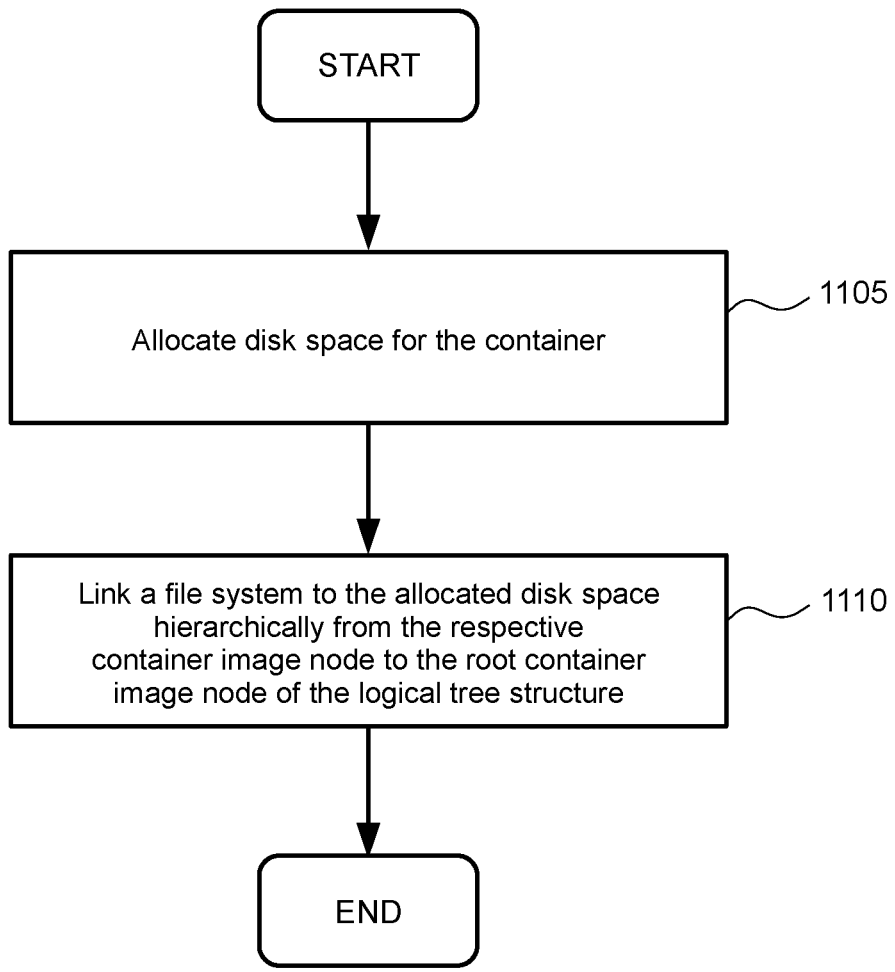
FIG. 11 illustrates a method of starting at least one container based upon a respective container image node, according to one or more embodiments.

FIG. 11 illustrates a method 1100 of starting the at least one container based upon the respective container image node. The method 1100 provides one or more embodiments with respect to step 915 of the method 900. The container deployment application executes the steps of the method 1100 for each container among the at least one container to be started from the respective container image node. The method 1100 begins at step 1105, where the container deployment application allocates disk space for the container. In an embodiment, the allocated disk space is associated with the disk in persistent storage of the container deployment application host instance on which the container image files are stored. In a related embodiment, the allocated disk space is allocated in ROM. At step 1110, the container deployment application links to the allocated disk space a file system hierarchically from the respective container image node to a root container image node of the logical tree structure. Per step 1110, the container deployment application links the file system associated with the logical tree structure included in the container image storage engine to the allocated disk space. In an embodiment, the file system incorporates links (e.g., shortcuts and/or other reference pointers) for some or all hierarchical levels from the respective container image node based upon which the container is started to the root container image node. For instance, in the context of starting an application framework container as illustrated in FIG. 3, the container deployment application links application framework container image file content (including container image file layers and container image file data) associated with the application framework container image node to programming language container image file content (including container image file layers and container image file data) associated with the programming language container image node and further to operating system container image file content (including container image file layers and container image file data) associated with the operating system container image node (the root container image node), such that the application framework container includes the application framework container image file content linked with the programming language container image file content and further linked with the operating system container image file content. By linking according to step 1110, the container deployment application need not copy and store all container image file content upon starting a container. Thus, linking per step 1110 reduces redundant storage of container image files corresponding to each hierarchical level of the logical tree structure.

Figure 12:
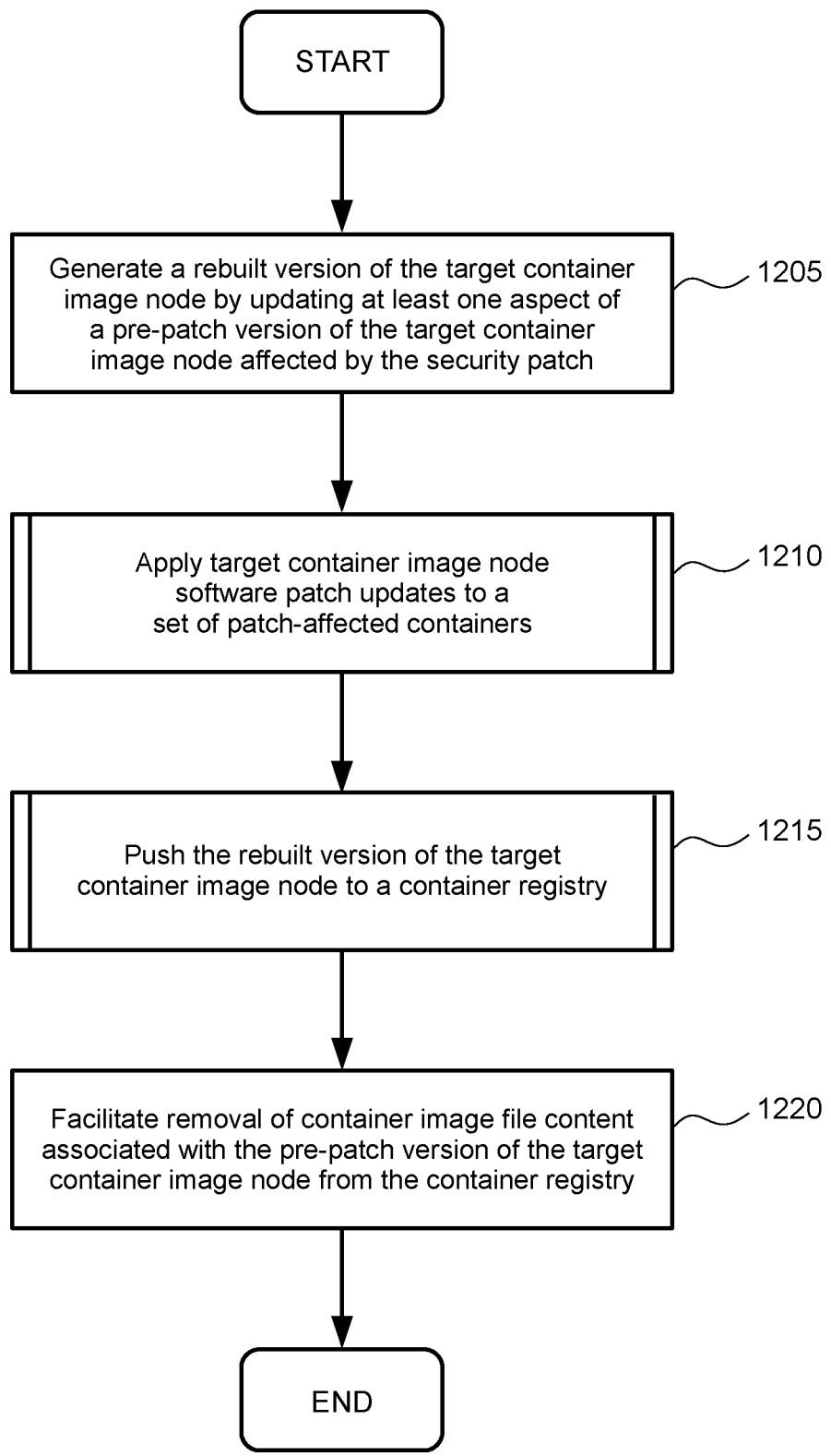
FIG. 12 illustrates a method of applying a software patch to a target container image node among a plurality of container image nodes, according to one or more embodiments.

FIG. 12 illustrates a method 1200 of applying the software patch to the target container image node among the plurality of container image nodes. The method 1200 provides one or more embodiments with respect to step 920 of the method 900. The container deployment application executes steps of the method 1200 in the context of patch application originating locally at the container deployment application host instance (i.e., locally at computer 101). The method 1200 begins at step 1205, where the container deployment application generates a rebuilt version of the target container image node by updating at least one aspect of a pre-patch version of the target container image node affected by the software patch. In the context of the method 1200 and related/analogous methods, the rebuilt version of the target container image node is a version of the target container image node generated consequent to application of the software patch. In the context of the method 1200 and related/analogous methods, a pre-patch version of the target container image node is a version predating application of the software patch. In an embodiment, the container deployment application generates the rebuilt version of the target container image node by rebuilding the target container image node according to steps of the method 1000. In a related embodiment, the container deployment application rebuilds the target container image node by updating the at least one aspect of the pre-patch version of target container image node affected by the software patch based upon updating at least one aspect of target container image file content affected by the software patch. According to such related embodiment, the container deployment application repackages the target container image node build result in order to include updated target container image file content and an updated target container image node reflective of the software patch. In a related embodiment, the container deployment application applies the build command, e.g., Docker build command, to generate the rebuilt target container image node per step 1205.

In an embodiment, the container deployment application updates the at least one aspect of the pre-patch version of the target container image node affected by the software patch per step 1205 by incorporating an updated hash data array into the target container image node based upon at least one updated hash data element. In a related embodiment, the container deployment application updates the target container image node to incorporate the updated hash data array by replacing a pre-patch hash data array with the updated hash data array based upon the software patch. Such update is necessitated by the software patch affecting container image file data associated with the target container image node. In an additional embodiment, the container deployment application updates the at least one aspect of the pre-patch version of the target container image node affected by the software patch per step 1205 by incorporating an updated hash layer array into the target container image node based upon at least one updated hash layer element, and incorporating an updated hash data array into the target container image node based upon at least one updated hash data element. In a related embodiment, the container deployment application updates the target container image node to incorporate the updated hash layer array by replacing a pre-patch hash layer array with the updated hash layer array based upon the software patch and further updates the target container image node to incorporate the updated hash data array by replacing a pre-patch hash data array with the updated hash data array based upon the software patch. Such update is necessitated by the software patch affecting container image file layer(s) associated with the target container image node, which consequently also affects container image file data associated with the target container image node.

At step 1210, the container deployment application applies target container image node software patch updates to a set of patch-affected containers. According to step 1210, the set of patch-affected containers includes at least one container started from the pre-patch version of the target container image node and any container started from any child container image node of the target container image node (i.e., any container started from any container image node having the target container image node as a base container image node). In an embodiment, the container deployment application identifies any child container image node of the target container image node by accessing the logical tree structure. Additionally or alternatively, the container deployment application identifies any child container image node of the target container image node by accessing image dependency datapoints associated with the target container image node that are derived from the logical tree structure. Such image dependency datapoints reflect respective dependency relationships between the target container image node and any child container image node in the logical tree structure. Per step 1210, the container deployment application relinks each of the set of patch-affected containers in order to apply the target container image node software patch updates. A method of applying the target container image node software patch updates to the set of patch-affected containers in accordance with step 1210 is described with respect to FIG. 13.

At step 1215, the container deployment application pushes the rebuilt version of the target container image node to a container registry (e.g., container registry 235). In an embodiment, the container registry is located on a registry server (e.g., registry server 230) remote from the container deployment application host instance. Per step 1215, the container deployment application pushes the rebuilt target container image node by uploading the rebuilt target container image node to the container registry. In an embodiment, the container deployment application applies a push command, e.g., Docker push command, to push the rebuilt version of the target container image node to the container registry. In an additional embodiment, consequent to the container deployment application pushing the rebuilt version of the target container image node to the container registry, a container deployment application associated with a remote host instance (e.g., one of remote computers $240_1$ to $240_n$) pulls the rebuilt version of the target container image node from the container registry. According to such additional embodiment, the container deployment application associated with the remote host instance pulls the rebuilt version of the target container image node by downloading the target container image node from the container registry. In a related embodiment, the container deployment application associated with the remote host instance applies a pull command, e.g., Docker pull command, to download the rebuilt version of the target container image node from the container registry. In a further embodiment, the container registry stores container image nodes in a logical tree structure analogous to the logical tree structure included in the container image storage engine. A method of pushing the rebuilt version of the target container image node to the container registry in accordance with step 1215 is described with respect to FIG. 15.

At step 1220, the container deployment application facilitates removal of container image file content associated with the pre-patch version of the target container image node from the container registry. Per step 1220, the container deployment application facilitates removal from the container registry of any file content that is deprecated or no longer supported based upon application of the software patch and further facilitates removal from the container registry of target container image node aspects that are deprecated or no longer supported based upon application of the software patch. In an embodiment, the container deployment application facilitates removal from the container registry of container image file content associated with the pre-patch version of the target container image node by sending at least one removal command to the registry server referencing the pre-patch version. Per step 1220, the container deployment application reduces redundant storage of container image data at the registry server. In an additional embodiment, the container deployment application removes container image file content associated with the pre-patch version of the target container image node from disk storage. According to such additional embodiment, the container deployment application removes container image file content associated with the pre-patch version of the target container image node from disk storage by refreshing the container image files stored on the disk of the container deployment application host instance to remove any file content that is deprecated or no longer supported based upon application of the software patch and further updates the container image node data at the container deployment application host instance to remove target container image node aspects that are deprecated or no longer supported based upon application of the software patch. According to such additional embodiment, the container deployment application reduces redundant storage of container image file content on disk.

Figure 13:
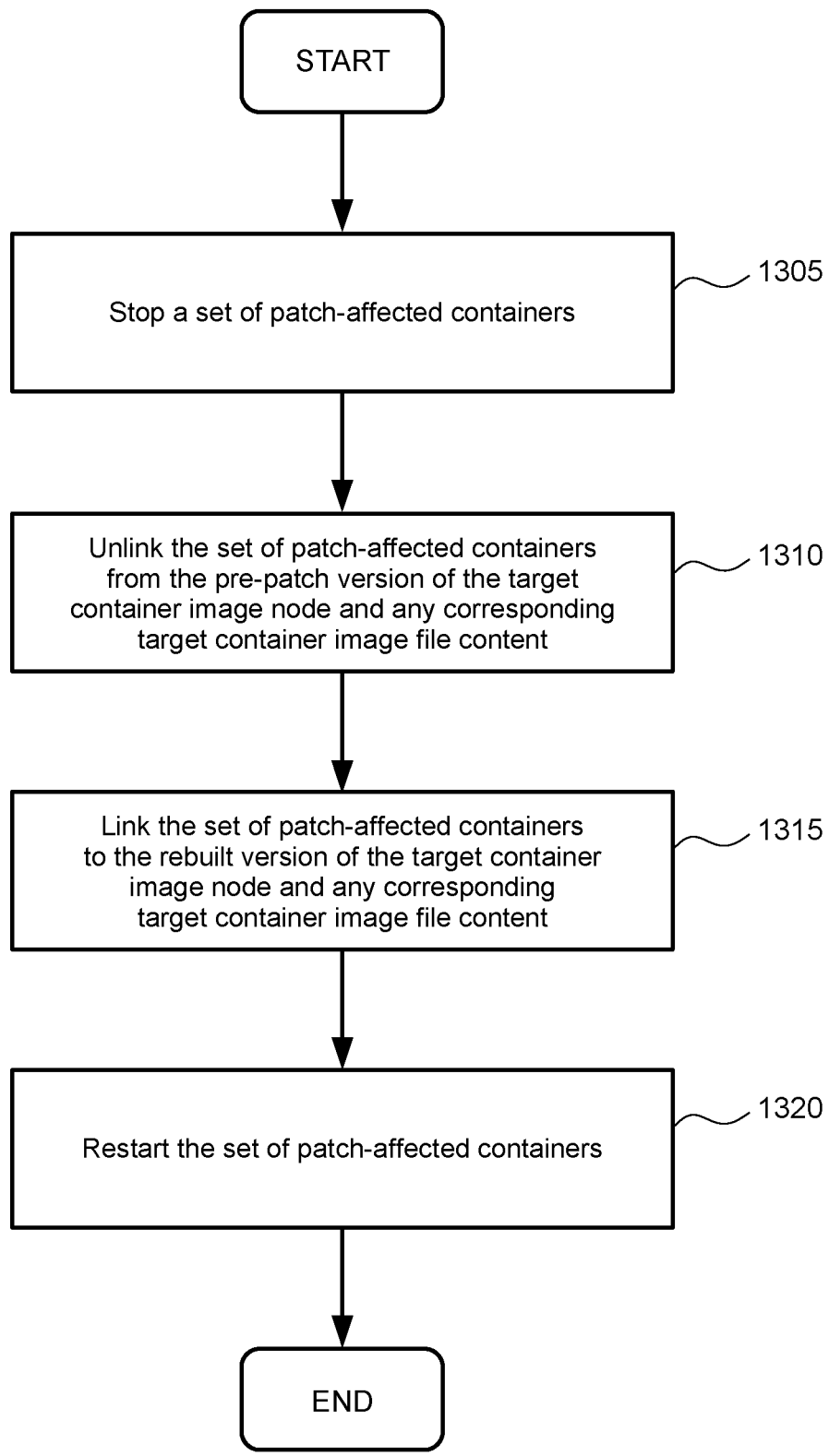
FIG. 13 illustrates a method of applying target container image node software patch updates to a set of patch-affected containers, according to one or more embodiments.

FIG. 13 illustrates a method 1300 of applying the target container image node software patch updates to the set of patch-affected containers. The method 1300 provides one or more embodiments with respect to step 1210 of the method 1200. The method 1300 begins at step 1305, where the container deployment application stops the set of patch-affected containers. Per step 1305, the container deployment application stops the at least one container started from the pre-patch version of the target container image node and further stops any container started from any child container image node of the target container image node. In an embodiment, the container deployment application applies a stop command, e.g., Docker stop command, to stop one or more of the set of patch-affected containers.

At step 1310, the container deployment application unlinks the set of patch-affected containers from the pre-patch version of the target container image node and any corresponding target container image file content loaded on allocated container disk space. In an embodiment, the container deployment application unlinks the set of patch-affected containers from the pre-patch version of the target container image node and any target container image file content corresponding to the pre-patch version of the target container image node by unlinking each of the set of patch-affected containers from the pre-patch version of the target container image node as loaded in RAM and by unlinking each of the set of patch-affected containers from container image file content associated with the pre-patch version of the target container image node loaded on allocated container disk space in ROM. At step 1315, the container deployment application links the set of patch-affected containers to the rebuilt version of the target container image node and any corresponding target container image file content loaded on allocated container disk space. In an embodiment, the container deployment application links the set of patch-affected containers to the rebuilt version of the target container image node and any target container image file content corresponding to the rebuilt version of the target container image node by linking each of the set of patch-affected containers to the rebuilt version of the target container image node as loaded in RAM and by linking each of the set of patch-affected containers to container image file content associated with the rebuilt version of the target container image node loaded on allocated container disk space in ROM.

At step 1320, the container deployment application restarts the set of patch-affected containers. Per step 1320, the container deployment application restarts the set of patch-affected containers based upon the rebuilt version of the target container image node. In an embodiment, the container deployment application applies a start command, e.g., Docker start command, to restart one or more of the set of patch-affected containers. In an alternative embodiment, responsive to determining that at least one running container among the set of patch-affected containers is associated with one or more applications supporting hot code replace (HCR), the container deployment application optionally applies the target container image node software patch updates to the at least one running container via HCR, thus avoiding stopping and restarting the at least one running container in order to apply the software patch updates.

Figure 14:
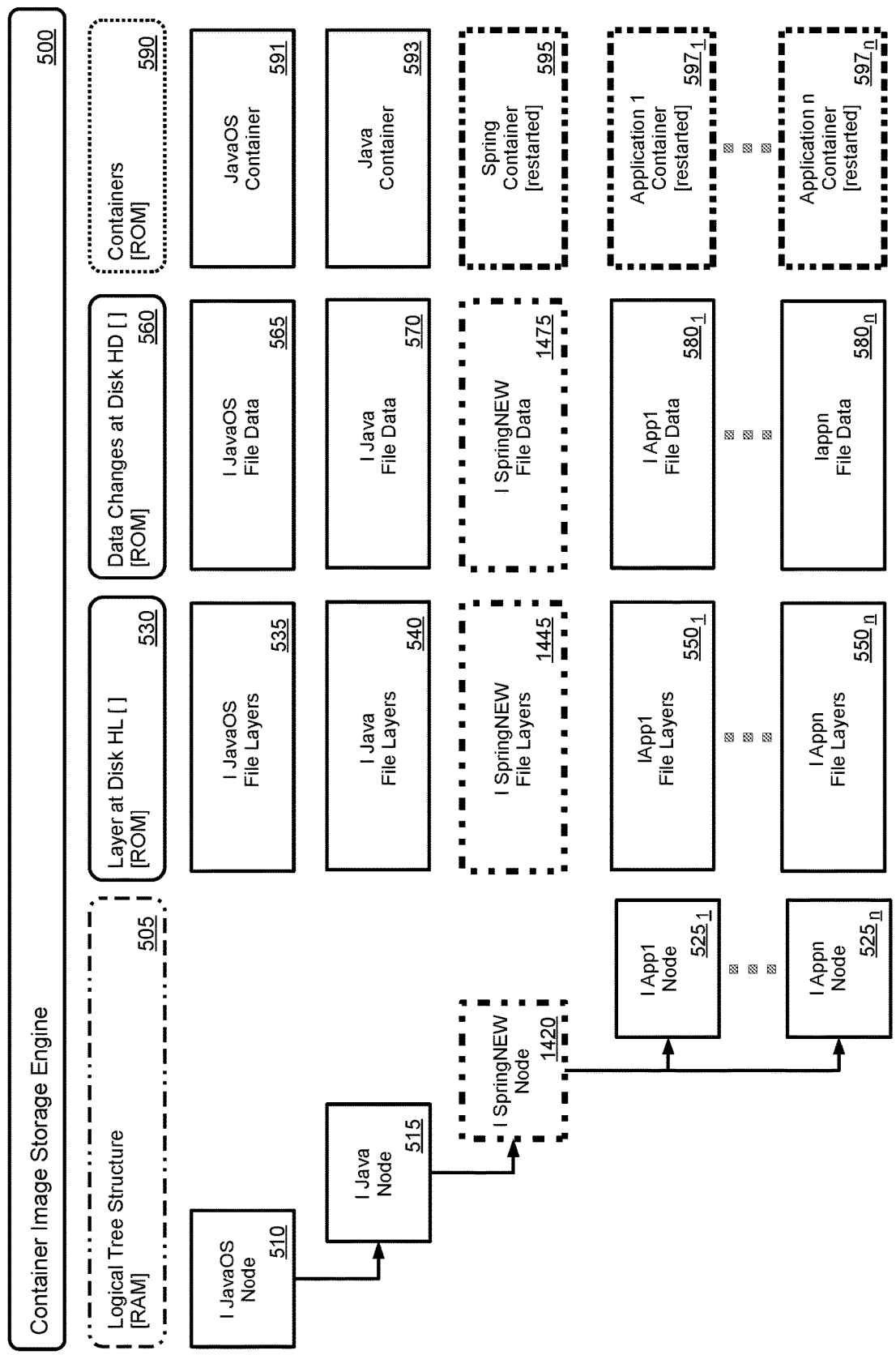
FIG. 14 illustrates a schematic diagram of the example container image storage engine implementation illustrated in FIG. 5 updated consequent to application of software patch updates, according to one or more embodiments.

FIG. 14 illustrates a schematic diagram of container image storage engine implementation 500 updated consequent to application of software patch updates affecting target container image node I Spring node 520 in accordance with the method 1300. Given that the software patch updates affect both container image file layer(s) associated with I Spring node 520 and container image file data associated with I Spring node 520, container deployment application 205 rebuilds the I Spring node 520 as I SpringNEW node 1420 having updated hash layer array and hash data array information, as reflected by I SpringNEW file layers 1445 and I SpringNEW file data 1475. Container deployment application 205 applies software patch updates to a set of patch-affected containers per the method 1300, which in this case includes Spring container 595 started from a pre-patch version of I Spring node 520 as well as to any container started from any child container image node of I Spring node 520, which in this case includes App1 to Appn containers $597_1$ to $597_n$. Thus, to apply the software patch, container deployment application 205 stops, relinks, and restarts each of Spring container 595 and App1 to Appn containers $597_1$ to $597_n$. Container deployment application 205 need not update I App1 to I Appn nodes $525_1$ to $525_n$ in order to apply the software patch. Furthermore, container deployment application 205 need not update I App1 to I Appn file layers $550_1$ to $550_n$ or I App1 to I Appn file data $580_1$ to $580_n$ in order to apply the software patch. According to the steps of the method 1300, the container deployment application applies updates without rebuilding a full container image stack.

Figure 15:
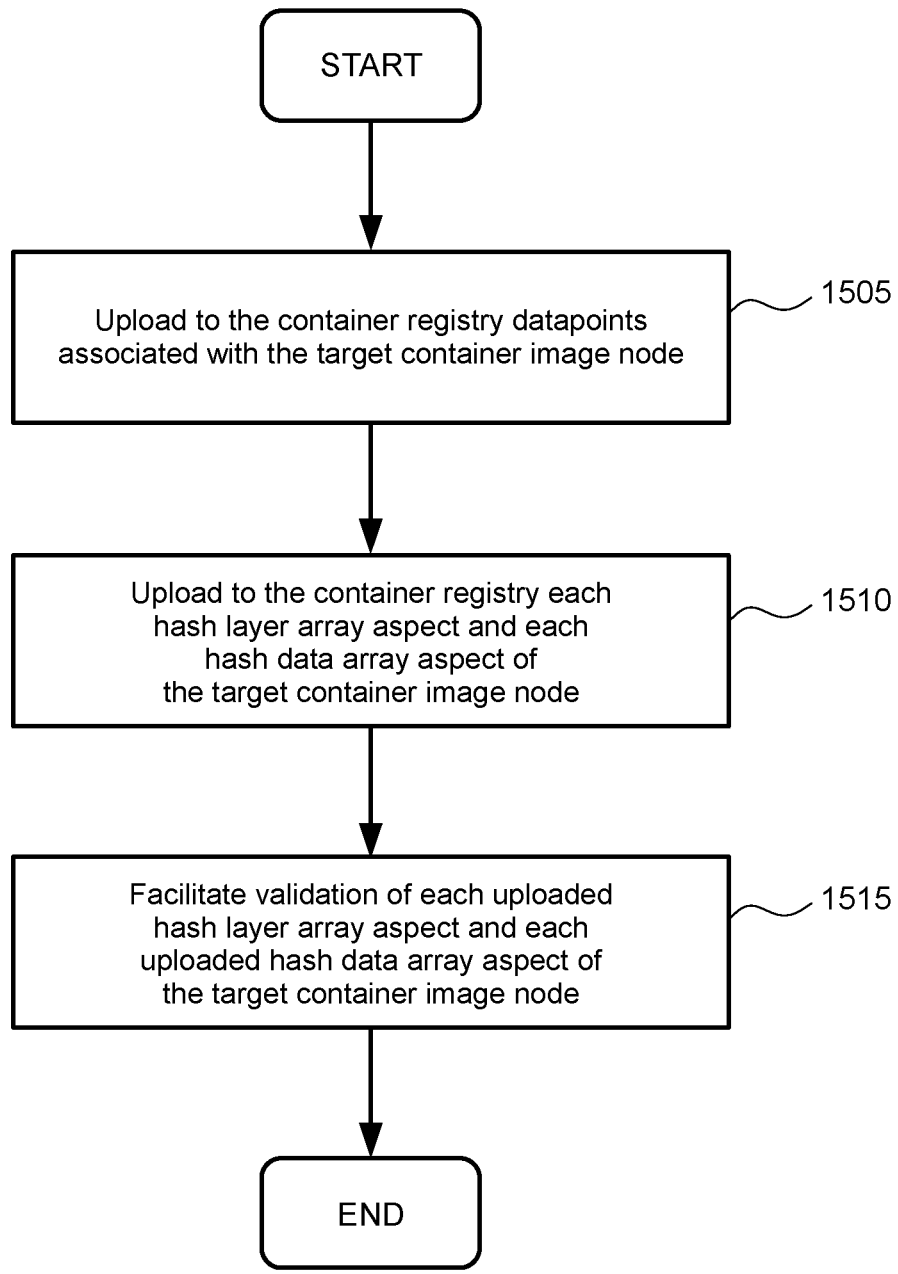
FIG. 15 illustrates a method of pushing a rebuilt version of a target container image node to a container registry, according to one or more embodiments.

FIG. 15 illustrates a method 1500 of pushing the rebuilt version of the target container image node to the container registry. The method 1500 provides one or more embodiments with respect to step 1215 of the method 1200. The method 1500 begins at step 1505, where the container deployment application uploads to the container registry datapoints associated with the target container image node. Per step 1505, the container deployment application uploads to the container registry information associated with the target container image node. At step 1510, the container deployment application uploads to the container registry each hash layer array aspect and each hash data array aspect of the target container image node. At step 1515, the container deployment application facilitates validation of each uploaded hash layer array aspect and each uploaded hash data array aspect of the target container image node based upon comparison (e.g., logical comparison) with the datapoints associated with the target container image node uploaded at step 1505. In an embodiment, the container deployment application validates, or facilitates validation of, receipt of each uploaded hash layer array aspect and each uploaded hash data array aspect to ensure no data loss during upload at step 1510. For instance, upon uploading a hash layer array element SHA256(Copy App.jar) and corresponding hash data array element SHA256(App.jar), the container deployment application validates, or facilitates validation of, uploading of such elements to the container registry based upon comparison of the array elements SHA256(Copy App.jar) and SHA256(App.jar) uploaded at step 1510 with the datapoints associated with the target container image node uploaded at step 1505. In a related embodiment, the container deployment application facilitates server-side validation of each uploaded hash layer array aspect and each uploaded hash data array aspect by facilitating comparison at the registry server, e.g., by providing any relevant comparison data to the registry server.

Figure 16:
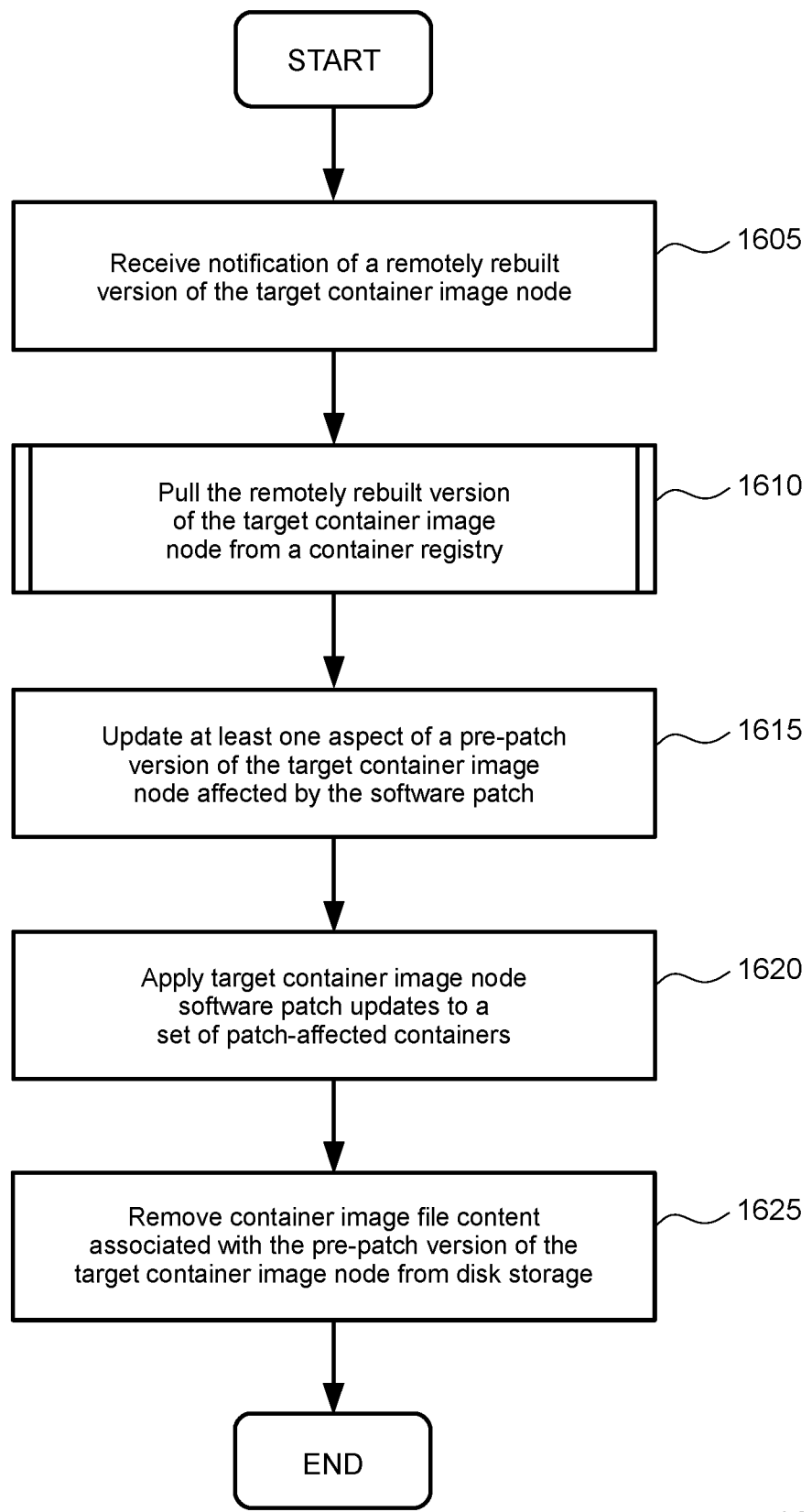
FIG. 16 illustrates a method of applying a software patch to a target container image node among a plurality of container image nodes, according to one or more further embodiments.

FIG. 16 illustrates a method 1600 of applying the software patch to the target container image node among the plurality of container image nodes. The method 1600 provides one or more further embodiments with respect to step 920 of the method 900. The container deployment application executes steps of the method 1600 in the context of patch application originating remotely from the container deployment application host instance (i.e., remotely from computer 101). Patch application in the context of the method 1600 originates at a remote host instance (e.g., one of remote computers $240_1$ to $240_n$). The method 1600 begins at step 1605, where the container deployment application receives notification of a remotely rebuilt version of the target container image node. According to step 1605, the remotely rebuilt version is created consequent to updating at least one target container image node aspect affected by the software patch. In an embodiment, the container deployment application receives notification of the remotely rebuilt version of the target container image node based upon a remote host instance pulling the remotely rebuilt version of the target container image node from the container registry. According to such embodiment, notification of the remotely rebuilt version is triggered automatically based upon a pull command, e.g., a Docker pull command, associated with the remotely rebuilt version. For instance, the container deployment application may be notified automatically when another remote host instance attempts to pull the remotely rebuilt version.

At step 1610, the container deployment application pulls the remotely rebuilt version of the target container image node from a container registry (e.g., container registry 235). In an embodiment, the container registry is located on a registry server (e.g., registry server 230) remote from the container deployment application host instance. In an additional embodiment, the container registry described in the context of the method 1600 and related methods is the container registry described in the context of the method 1200 and related methods. According to step 1610, the container deployment application pulls the remotely rebuilt version of the target container image node in order to apply updates made to the at least one target container image node aspect affected by the software patch. Per step 1610, the container deployment application pulls the remotely rebuilt target container image node by downloading the rebuilt target container image node from the container registry. In a further embodiment, the container deployment application applies a pull command, e.g., Docker pull command, to download the remotely rebuilt version of the target container image node from the container registry. A method of pulling the remotely rebuilt version of the target container image node from the container registry in accordance with step 1610 is described with respect to FIG. 17.

At step 1615, the container deployment application updates at least one aspect of a pre-patch version of the target container image node affected by the software patch based upon comparison (e.g., logical comparison) with the remotely rebuilt version of the target container image node. In an embodiment, the container deployment application identifies the at least one aspect of the pre-patch version of the target container image node affected by the software patch by logically comparing the pre-patch version of the target container image node with the remotely rebuilt version of the target container image node. In a related embodiment, the container deployment application logically compares hash layer array and hash data array aspects of the remotely rebuilt version of the target container image node to corresponding hash layer array and hash data array aspects of the pre-patch version of the target container image node. In an additional embodiment, the container deployment application updates the at least one aspect of the pre-patch version of the target container image node affected by the software patch per step 1615 by incorporating an updated hash data array into the target container image node based upon at least one updated hash data element. In a related embodiment, the container deployment application updates the target container image node to incorporate the updated hash data array by replacing a pre-patch hash data array with the updated hash data array based upon the software patch. In a further embodiment, the container deployment application updates the at least one aspect of the pre-patch version of the target container image node affected by the software patch per step 1615 by incorporating an updated hash layer array into the target container image node based upon at least one updated hash layer element, and incorporating an updated hash data array into the target container image node based upon at least one updated hash data element. In a related embodiment, the container deployment application updates the target container image node to incorporate the updated hash layer array by replacing a pre-patch hash layer array with the updated hash layer array based upon the software patch and further updates the target container image node to incorporate the updated hash data array by replacing a pre-patch hash data array with the updated hash data array based upon the software patch. In an alternative embodiment, responsive to determining that no pre-patch version of the target container image node exists at the container deployment application host instance, the container deployment application adds the rebuilt version of the target container image node to the logical tree structure upon pulling per step 1610 and then proceeds to the end of the method 1600.

At step 1620, the container deployment application applies target container image node software patch updates to a set of patch-affected containers. According to step 1620, the set of patch-affected containers includes at least one container started from the pre-patch version of the target container image node and any container started from any child container image node of the target container image node. Applying the target container image node software patch updates per step 1620 is analogous to applying target container image node software patch updates per step 1210. In an embodiment, responsive to determining the set of patch-affected containers, the container deployment application executes one or more steps analogous to the steps of the method 1300. According to such embodiment, the container deployment application applies the target container image node software patch updates by stopping the set of patch-affected containers, unlinking the set of patch-affected containers from the pre-patch version of the target container image node and any corresponding target container image file content, linking the set of patch-affected containers to the remotely rebuilt version of the target container image node and any corresponding target container image file content, and restarting the set of patch-affected containers based upon the remotely rebuilt version of the target container image node. In an alternative embodiment, responsive to determining that at least one running container among the set of patch-affected containers is associated with one or more applications supporting HCR, the container deployment application optionally applies the target container image node software patch updates to the at least one running container via HCR, thus avoiding stopping and restarting the at least one running container in order to apply the software patch updates.

At step 1625, the container deployment application removes container image file content associated with the pre-patch version of the target container image node from disk storage. In an embodiment, the container deployment application removes container image file content associated with the pre-patch version of the target container image node from disk storage by refreshing the container image files stored on the disk of the container deployment application host instance to remove any file content that is deprecated or no longer supported based upon application of the software patch and further updates the container image node data at the container deployment application host instance to remove target container image node aspects that are deprecated or no longer supported based upon application of the software patch. Per step 1625, the container deployment application reduces redundant storage of container image file content on disk.

Figure 17:
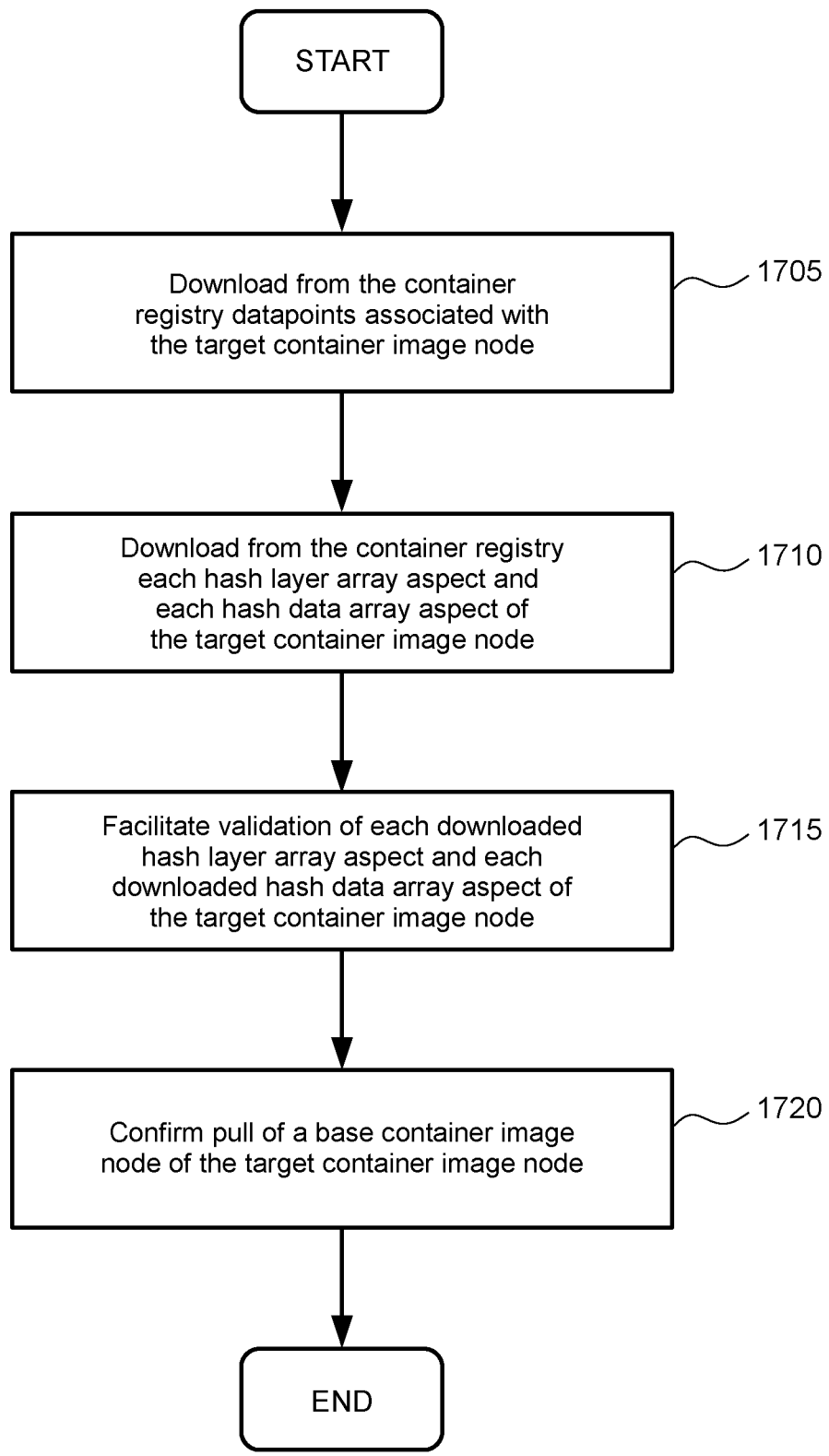
FIG. 17 illustrates a method of pulling a remotely rebuilt version of a target container image node from a container registry, according to one or more embodiments.

FIG. 17 illustrates a method 1700 of pulling the remotely rebuilt version of the target container image node from the container registry. The method 1700 provides one or more embodiments with respect to step 1610 of the method 1600. The method 1700 begins at step 1705, where the container deployment application downloads from the container registry datapoints associated with the target container image node. Per step 1705, the container deployment application downloads from the container registry information associated with the target container image node. At step 1710, the container deployment application downloads from the container registry each hash layer array aspect and each hash data array aspect of the target container image node. At step 1715, the container deployment application facilitates validation of each downloaded hash layer array aspect and each downloaded hash data array aspect of the target container image node based upon comparison (e.g., logical comparison) with the downloaded datapoints associated with the target container image node. In an embodiment, the container deployment application validates, or facilitates validation of, receipt of each downloaded hash layer array aspect and each downloaded hash data array aspect to ensure no data loss during download at step 1710. For instance, upon downloading a hash layer array element SHA256 (Copy App.jar) and corresponding hash data array element SHA256(App.jar), the container deployment application validates, or facilitates validation of, downloading of such elements to the container registry based upon comparison of the array elements SHA256(Copy App.jar) and SHA256 (App.jar) downloaded at step 1710 with the datapoints associated with the target container image node downloaded at step 1705. In a related embodiment, the container deployment application facilitates server-side validation of receipt of each downloaded hash layer array aspect and each downloaded hash data array aspect by facilitating comparison at the registry server, e.g., by providing any relevant comparison data to the registry server. At step 1720, the container deployment application confirms pull of a base container image node of the target container image node. Per step 1720, responsive to determining that the base container image node of the target container image node is not pulled, the container deployment application repeats previous steps of the method 1700 in order to download and validate base container image node aspects.

Figure 18:
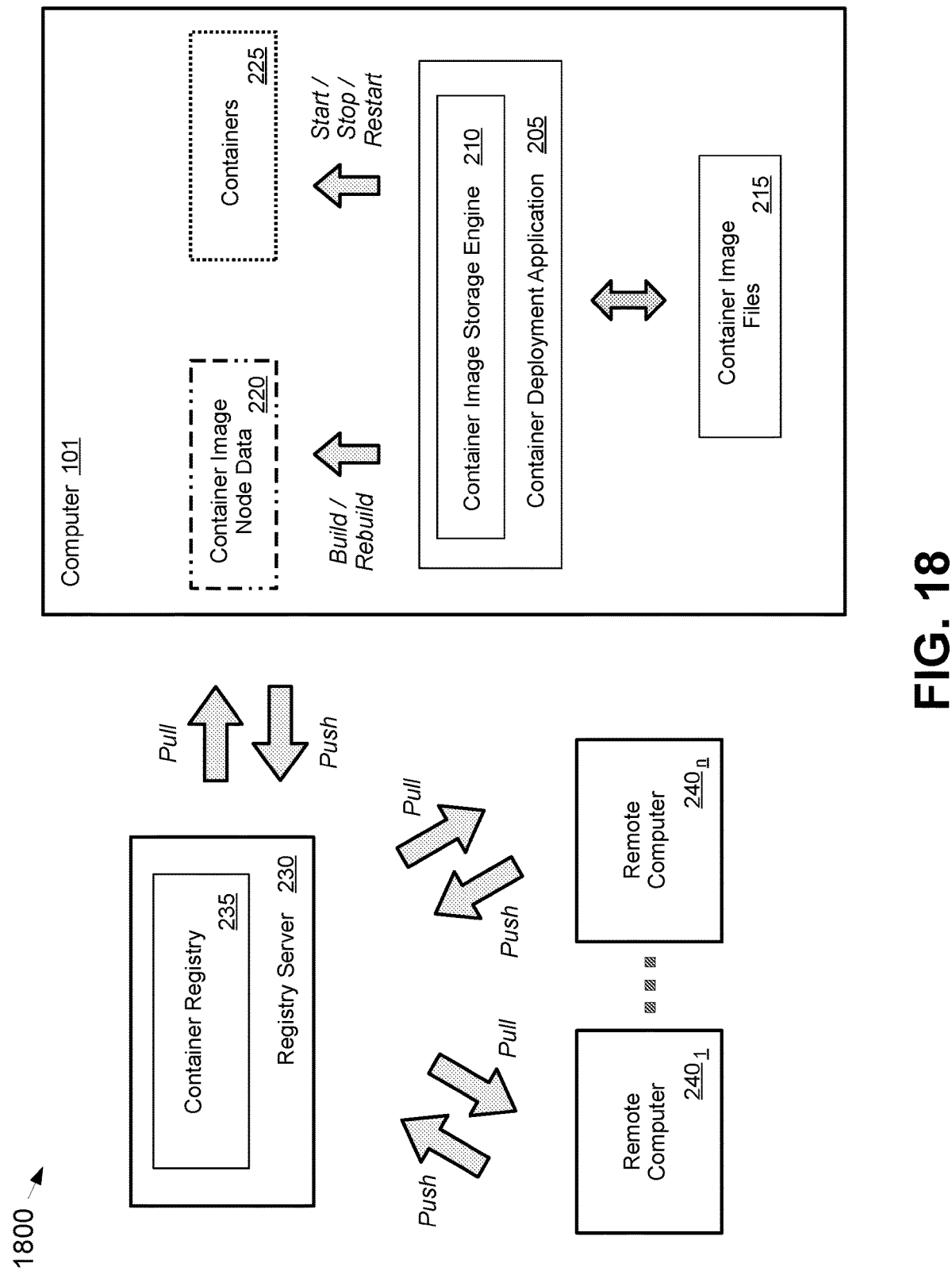
FIG. 18 illustrates a container image processing schematic diagram in the context of the container image management infrastructure illustrated in FIG. 2, according to one or more embodiments.

FIG. 18 illustrates a container image processing schematic diagram 1800 in the context of container image management infrastructure 200. Schematic diagram 1800 depicts via italicized annotations respective command processes executed consequent to applying a software patch according to the method 900 and related methods. In the context of applying a software patch affecting a target container image node, from the purview of the container deployment application host instance, i.e., computer 101, container deployment application 205 may rebuild the target container image node. Subsequent to rebuilding the target container image node and applying the software patch, container deployment application 205 may push the rebuilt version of the target container image node to container registry 235, and respective applications associated with other host instances (e.g., remote computers $240_1$ to $240_n$) may pull the rebuilt version of the target container image node from container registry 235 in order to apply software patch updates remotely. In another instance, from the purview of computer 101, subsequent to a software patch applied to a target container image node at one of remote computers $240_1$ to $240_n$, a respective application at such remote computer may push a remotely rebuilt version of the target container image node to container registry 235, and container deployment application 205 may pull the remotely rebuilt version of the target container image node from container registry 235 and apply software patch updates locally. In the context of computer 101, container deployment application 205 may start, stop, and restart a respective container among containers 225 to apply a software patch affecting the target container image node. More generally, in the context of computer 101, container deployment application 205 may build a respective container image node associated with logical tree structure 305 of container image storage engine 210.

The descriptions of the various embodiments have been presented for purposes of illustration but are not intended to be exhaustive or limited to the embodiments disclosed. All kinds of modifications made to the described embodiments and equivalent arrangements should fall within the protected scope of the various embodiments. Hence, the scope should be explained most widely according to the claims that follow in connection with the detailed description and should cover all possibly equivalent variations and equivalent arrangements. Many modifications and variations will be apparent to those of ordinary skill in the art without departing from the scope and spirit of the described embodiments. The terminology used herein is chosen to best explain the principles of the various embodiments, the practical application or technical improvement over technologies found in the marketplace, or to enable others of ordinary skill in the art to understand the various embodiments.

What is claimed is:

1. A computer-implemented method comprising:
   initializing a container image storage engine associated with a logical tree structure having a plurality of container image nodes, wherein each of the plurality of container image nodes includes a hash layer array and a hash data array;
   building at least one new container image node to incorporate into the plurality of container image nodes; and
   applying a software patch to a target container image node among the plurality of container image nodes.

2. The computer-implemented method of claim 1, further comprising:
   starting at least one container based upon a respective container image node among the plurality of container image nodes.

3. The computer-implemented method of claim 2, wherein starting the at least one container based upon the respective container image node comprises, for each container among the at least one container:
   allocating disk space for the container; and
   linking a file system to the allocated disk space hierarchically from the respective container image node to a root container image node of the logical tree structure.

4. The computer-implemented method of claim 1, wherein building the at least one new container image node to incorporate into the plurality of container image nodes comprises, for each new container image node among the at least one container image node:
   loading a base container image node of the new container image node;
   loading the new container image node into the logical tree structure of the container image storage engine;
   copying hash layer array aspects and hash data array aspects into the new container image node; and
   packaging a container image build result including the new container image node as metadata.

5. The computer-implemented method of claim 1, wherein building the at least one new container image node to incorporate into the plurality of container image nodes comprises:
   encapsulating at least one common aspect of multiple container image nodes among the plurality of container image nodes into a virtual container image node.

6. The computer-implemented method of claim 1, wherein applying the software patch to the target container image node comprises:
   generating a rebuilt version of the target container image node by updating at least one aspect of a pre-patch version of the target container image node affected by the software patch; and
   applying target container image node software patch updates to a set of patch-affected containers, the set of patch-affected containers including at least one container started from the pre-patch version of the target container image node and any container started from any child container image node of the target container image node.

7. The computer-implemented method of claim 6, wherein updating the at least one aspect of the pre-patch version of the target container image node affected by the software patch comprises:
   incorporating an updated hash data array into the target container image node based upon at least one updated hash data element.

8. The computer-implemented method of claim 6, wherein updating the at least one aspect of the pre-patch version of the target container image node affected by the software patch comprises:
   incorporating an updated hash layer array into the target container image node based upon at least one updated hash layer element, and incorporating an updated hash data array into the target container image node based upon at least one updated hash data element.

9. The computer-implemented method of claim 6, wherein applying the software patch to the target container image node further comprises:

pushing the rebuilt version of the target container image node to a container registry.

10. The computer-implemented method of claim 9, wherein pushing the rebuilt version of the target container image node to the container registry comprises:
uploading to the container registry datapoints associated with the target container image node;
uploading to the container registry each hash layer array aspect and each hash data array aspect of the target container image node; and
facilitating validation of each uploaded hash layer array aspect and each uploaded hash data array aspect of the target container image node based upon comparison with the uploaded datapoints associated with the target container image node.

11. The computer-implemented method of claim 6, wherein applying the software patch to the target container image node further comprises:
facilitating removal of container image file content associated with the pre-patch version of the target container image node from the container registry.

12. The computer-implemented method of claim 6, wherein applying the target container image node software patch updates to the set of patch-affected containers comprises:
stopping the set of patch-affected containers;
unlinking the set of patch-affected containers from the pre-patch version of the target container image node and any corresponding target container image file content loaded on allocated container disk space;
linking the set of patch-affected containers to the rebuilt version of the target container image node and any corresponding target container image file content loaded on allocated container disk space; and
restarting the set of patch-affected containers.

13. The computer-implemented method of claim 1, wherein applying the software patch to the target container image node comprises:
pulling a remotely rebuilt version of the target container image node from a container registry;
updating at least one aspect of a pre-patch version of the target container image node affected by the software patch based upon comparison with the remotely rebuilt version of the target container image node;
applying target container image node software patch updates to a set of patch-affected containers, the set of patch-affected containers including at least one container started from the pre-patch version of the target container image node and any container started from any child container image node of the target container image node; and
removing container image file content associated with the pre-patch version of the target container image node from disk storage.

14. The computer-implemented method of claim 13, wherein pulling the remotely rebuilt version of the target container image node from the container registry comprises:
downloading from the container registry datapoints associated with the target container image node;
downloading from the container registry each hash layer array aspect and each hash data array aspect of the target container image node;
facilitating validation of each downloaded hash layer array aspect and each downloaded hash data array aspect of the target container image node based upon comparison with the downloaded datapoints associated with the target container image node; and
confirming pull of a base container image node of the target container image node.

15. A computer program product comprising a computer readable storage medium having program instructions embodied therewith, the program instructions executable by a computing device to cause the computing device to:
initialize a container image storage engine associated with a logical tree structure having a plurality of container image nodes, wherein each of the plurality of container image nodes includes a hash layer array and a hash data array;
build at least one new container image node to incorporate into the plurality of container image nodes; and
apply a software patch to a target container image node among the plurality of container image nodes.

16. The computer program product of claim 15, wherein the program instructions further cause the computing device to:
start at least one container based upon a respective container image node among the plurality of container image nodes.

17. The computer program product of claim 16, wherein starting the at least one container based upon the respective container image node comprises, for each container among the at least one container:
allocating disk space for the container; and
linking to the allocated disk space a file system hierarchically from the respective container image node to a root container image node of the logical tree structure.

18. A system comprising:
at least one processor; and
a memory storing an application program, which, when executed on the at least one processor, performs an operation comprising:
initializing a container image storage engine associated with a logical tree structure having a plurality of container image nodes, wherein each of the plurality of container image nodes includes a hash layer array and a hash data array;
building at least one new container image node to incorporate into the plurality of container image nodes; and
applying a software patch to a target container image node among the plurality of container image nodes.

19. The system of claim 18, wherein the operation further comprises:
starting at least one container based upon a respective container image node among the plurality of container image nodes.

20. The system of claim 19, wherein starting the at least one container based upon the respective container image node comprises, for each container among the at least one container:
allocating disk space for the container; and
linking to the allocated disk space a file system hierarchically from the respective container image node to a root container image node of the logical tree structure.

* * * * *